United States Patent
Irizato et al.

(10) Patent No.: US 6,346,569 B1
(45) Date of Patent: *Feb. 12, 2002

(54) PRODUCTION PROCESS OF CROSS-LINKED POLYSUCCINIMIDE RESIN

(75) Inventors: Yoshihiro Irizato; Makoto Sukegawa, both of Kanagawa; Toshio Katoh, Saitama; Hiroaki Tamatani, Kanagawa; Akinori Nagatomo; Masaru Wada, both of Fukuoka, all of (JP)

(73) Assignee: Mitsui Chemicals, Inc. (JP)

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/514,954

(22) Filed: Feb. 28, 2000

Related U.S. Application Data

(62) Division of application No. 09/042,942, filed on Mar. 17, 1998, now Pat. No. 6,072,024.

(30) Foreign Application Priority Data

| Mar. 21, 1997 | (JP) | ............................................. | 9-068185 |
| Mar. 21, 1997 | (JP) | ............................................. | 9-068186 |
| Apr. 18, 1997 | (JP) | ............................................. | 9-102082 |
| Apr. 18, 1997 | (JP) | ............................................. | 9-102083 |
| Apr. 18, 1997 | (JP) | ............................................. | 9-102084 |
| Apr. 24, 1997 | (JP) | ............................................. | 9-107770 |

(51) Int. Cl.$^7$ .................. C08J 3/24; C08F 283/04; C08G 73/10; C08G 69/10
(52) U.S. Cl. .................. 524/538; 525/420; 525/421; 525/422; 528/328; 528/332; 528/335; 528/345; 528/363; 528/688; 528/491; 528/499
(58) Field of Search .......................... 524/538; 525/420, 525/421, 422; 528/328, 332, 335, 345, 363, 488, 491, 499

(56) References Cited

U.S. PATENT DOCUMENTS

| 5,461,085 A | 10/1995 | Nagatomo et al. |
| 5,986,042 A | \* 11/1999 | Irizato et al. ................ 528/358 |

\* cited by examiner

*Primary Examiner*—Duc Truong
(74) *Attorney, Agent, or Firm*—Burns, Doane, Swecker, & Mathis, L.L.P.

(57) ABSTRACT

A process is disclosed for producing with good productivity a cross-linked polyaspartic acid resin having biodegradability and high water absorbency. The process features inclusion of one of the following steps: (a) a polysuccinimide, which has been brought into a dispersed state by a dispersant, and a cross-linking agent are reacted to produce the cross-linked polyaspartic acid resin; (b) imide rings of a cross-linked polysuccinimide are subjected to a hydrolysis reaction while controlling a swelling degree of a resulting gel, whereby the cross-linked polyaspartic acid resin is produced; and (c) a gel of a cross-linked polysuccinimide, which has been obtained by reacting a cross-linking agent to a solution of a polysuccinimide in an organic solvent, is disintegrated to subject imide rings of the cross-linked polysuccinimide to a hydrolysis reaction, so that the cross-linked polyaspartic acid resin is produced. The process may also include one or both of the following steps as needed: (d) a gel of the cross-linked polyaspartic acid resin is washed with water and/or a water-miscible organic solvent; and (e) the polysuccinimide is produced using a basic amino acid as a cross-linking agent.

11 Claims, No Drawings

US 6,346,569 B1

PRODUCTION PROCESS OF CROSS-LINKED POLYSUCCINIMIDE RESIN

This application is a divisional, of application Ser. No. 09/042,942, filed Mar. 17. 1998, now U.S. Pat. No. 6,072,024.

BACKGROUND OF THE INVENTION

1. Field of the Invention

This invention relates to a process for the production of a cross-linked polyaspartic acid resin having (bio) degradability and high water absorbency and also to a process for the production of a cross-linked polysuccinimide useful as a precursor for the cross-linked polyaspartic acid resin.

2. Description of the Related Art

[Technical Background of Superabsorbent Polymers]

A superabsorbent polymer is a resin capable of absorbing water from several tens of times to several thousands of times its own weight, and is used in sanitary products, such as sanitary napkins and disposable diapers, and also in a variety of other fields.

[Related Art on Superabsorbent Polymers]

Known examples of superabsorbent polymers employed in such applications include partial neutralization products of cross-linked polyacrylic acids (JP Kokai No. 55-84304, U.S. Pat. No. 4,625,001), partial hydrolysis products of starch-acrylonitrile copolymers (JP Kokai 46-43995), starch-acrylic acid graft copolymers (JP Kokai 51-125468), hydrolyzation products of vinyl acetate-acrylate ester copolymers (JP Kokai 52-14689), cross-linked copolymers of 2-acryl-amido-2-methylpropanesulfonic acid and acrylic acid (EP 0068189), cross-linked polymers of cationic monomers (U.S. Pat. No. 4,906,717), and hydrolysis products of cross-linked isobutylene-maleic anhydride copolymers (U.S. Pat. No. 4,389,513).

These superabsorbent polymers however are accompanied by the problem that they do not degrade following disposal after use.

Under the circumstances, these superabsorbent polymers are currently disposed of by incineration or reclamation. However, it is indicated that disposal in incinerators is a cause of global warming and acid rain in addition to a cause of damage to incinerator materials due to heat occurring during incineration. On the other hand, reclamation disposal is accompanied by problems such as poor stabilization of reclaimed grounds due to the bulky and undegradable nature of plastics and, moreover, is facing a serious problem in that there are no longer many sites suited for reclamation.

Described specifically, these polymers are poor in degradability and remain semipermanently in water or soil. Their disposal presents a very serious problem from the viewpoint of environmental preservation. For example, in the case of polymers for disposable applications, led by sanitary products such as disposable diapers and sanitary napkins, their recycling, if tried, would require substantial expenditure while their incineration, if attempted, would significantly affect the global environment due to the enormous quantities involved. On the other hand, it has been reported that use of a cross-linked polyacrylic acid resin as an agricultural and horticultural water-holding material leads to the formation of complexes with multivalent ions such as $Ca^{2+}$ in soil and hence results in the formation of an insoluble layer [Matsumoto et al., KOBUNSHI (High Polymer, Japan), 42, August, 1993]. Such a layer is considered to have low toxicity by itself but is not found at all in the natural world. Nothing is known about their influence on the ecosystem resulting from an accumulation of such polymers in soil over a long period and therefore, a thorough investigation is needed. A cautious attitude towards their use is hence desirable. Likewise, non-ionic resins have a potential problem of accumulating in soil due to their undegradable nature although they do not form complexes. It is therefore likely that they would have adverse effects on the natural world.

Furthermore, these polymerized resins use monomers which are highly toxic to human skin and the like. A great deal of work has been conducted to eliminate such monomers from polymerized products. Nonetheless, their complete elimination is difficult. Still higher difficulties are expected especially in the production on an industrial scale.

[Technical Background of Superabsorbent Polymers Having Biodegradability]

On the other hand, biodegradable polymers have been attracting interest as "globe-compatible materials" in recent years. Their use as superabsorbent polymers has also been proposed.

Known examples of biodegradable superabsorbent polymers employed in such applications include cross-linked polyethylene oxide (JP Kokai 6-157795, etc.), cross-linked polyvinyl alcohol, cross-linked carboxymethylcellulose (U.S. Pat. No. 4,650,716), cross-linked alginic acid, cross-linked starches, and cross-linked polyamino acids. Among these, the cross-linked polyethylene oxide and cross-linked polyvinyl alcohol have small water absorption and are hence not particularly suited for use as materials in products requiring high water-absorbency such as sanitary products, disposable diapers, disposable dustcloths and paper towels.

Further, these compounds can be biodegraded only by certain particular bacteria, so that under general conditions, their biodegradation will be slow or will not take place at all. Moreover, the biodegradability will be reduced extremely as the molecular weight becomes greater.

In addition, cross-linked saccharides such as cross-linked carboxymethylcellulose, cross-linked alginic acid and cross-linked starches contain many firm hydrogen bonds in their molecules, thereby exhibiting strong interaction between molecules and/or polymers. Accordingly, molecular chains cannot be opened widely meaning that their water-absorbency is not high.

[Technical Background of Polyamino Acid Superabsorbent Polymers]

On the other hand, polymers which are available by cross-linking polyamino acids do have biodegradability and are thus compatible with the global environment. It has also been found that, even when absorbed in the body, they are digested and absorbed by enzymatic action and moreover, they do not exhibit antigenecity in the body and their metabolites are free of toxicity. These polymers are accordingly materials which are also safe for human beings.

As a disclosed example of such a polymer, a process for the production of a polymer having high water-absorbency, which comprises irradiating γ rays to poly-γ-glutamic acid, was reported by Kunioka et al. in KOBUNSHI RONBUN-SHU (The Journal of the Society of Polymer Science, Japan), 50(10), 755 (1993). From an industrial viewpoint, however, a $^{60}Co$ irradiation system for use in this technology requires considerable equipment for shielding radiation, and sufficient care is also required for its control. This technology is therefore not practical. As a further problem, the high cost of polyglutamic acid as the starting substance can also be mentioned.

In addition, processes for obtaining a hydrogel by cross-linking an acidic amino acid were reported by Akamatsu et al. in U.S. Pat. No. 3,948,863 (corres. JP Kokoku 52-41309) and Iwatsuki et al. in JP Kokai 5-279416. Further, use of cross-linked amino acid polymers as superabsorbent polymers was reported by Sikes et al. in JP PCT Kokai 6-506244 (corres. U.S. Pat. No. 5,247,068 and U.S. Pat. No. 5,284, 936), Suzuki et al. in JP Kokai 7-309943 and Harada et al. in JP Kokai 8-59820.

In all the above reports, however, these polymers did not have sufficient water or saline absorbency and were not practically usable. Further, these resins are accompanied by a problem that their gels have low strength and become sticky with time.

[Background of Technical Concept of the Present Inventors]

As is described in JP Kokai 7-224163, the present inventors disclosed a technique for the production of a cross-linked polyaspartic acid resin having high saline absorbency, which comprises reacting a polysuccinimide with a cross-linking agent to hydrolyze remaining imide rings.

Further, as is disclosed in JP Kokai 9-169840, the present inventors also disclosed a technique for the production of a cross-linked polyaspartic acid resin having saline absorbency, which comprises crosslinking a polysuccinimide and then hydrolyzing remaining imide rings in an intimately mixed solvent of a water-miscible organic solvent and water.

Cross-linked polyaspartic acid resins available by these techniques are very useful for their globe-compatibility and high water absorbency. From the industrial viewpoint, however, there is room for further improvements. Described specifically, the concentrations of cross-linked polyaspartic acid resins produced in these production processes are as low as about 5 wt. %, indicating the existence of room for an improvement in volumetric efficiency. Further, according to the knowledge of the present inventors, hydrolysis of imide rings of a cross-linked polysuccinimide in water upon production of a cross-linked polyaspartic acid resin causes the resin in the reaction system to absorb water and swell, resulting in significant gelation. This makes it difficult to stir the reaction system. A hydrolyzing reagent can no longer spread so that the reaction is not allowed to proceed sufficiently. This results in a problem that the thus-produced cross-linked polyaspartic acid resin is not provided with high water absorbency. On the other hand, hydrolysis in an organic solvent or a mixed solvent of water and an organic solvent, said mixed solvent containing the organic solvent in a high proportion, tends to allow the resin in the reaction system to undergo a hydrolysis reaction only at surfaces of resin particles, so that the reaction velocity of the hydrolysis becomes very slow. This also results in the problem that the thus-produced cross-linked polyaspartic acid resin is not provided with high water absorbency.

The present inventors found that cross-linked polyaspartic acid resins produced as described above contain water-soluble impurities such as water-soluble polymers and salts. Accordingly, they have room for further improvements such as an improvement in gel strength, the elimination of stickiness on a gel surface and improvements in absorbency for salt-containing aqueous solutions.

In the production process of JP Kokai 7-224163, a failure in the full control of the production step of a cross-linked polysuccinimide may not allow the cross-linking to proceed sufficiently so that a superabsorbent resin having high water absorbency may not be obtained. According to the production process disclosed in JP Kokai 9-169840, the resin absorbs a reaction solvent during a cross-linking reaction in the production step of a cross-linked polysuccinimide and the reaction system is thus solidified. This makes it difficult to perform the reaction under stirring, or post-reaction treatments become extremely difficult. This production process is therefore not suited for industrial production. The production process of a cross-linked polysuccinimide as a precursor of a cross-linked polyaspartic acid resin has room for improvements in connection with simplification and improvements of process control and process steps themselves.

In JP Kokai 7-224163 and JP Kokai 9-169840, it is described that use of a basic amino acid, such as lysine or ornithine, as a polyamine for use as a cross-linking agent is preferred from the standpoint of the safety of the remaining unreacted cross-linking agent and decomposition products. However, the basic polyamino acids specifically disclosed in these publications involve problems such that they are low in reactivity and that, although use of their esters can provide improvements in reactivity, these esters themselves are costly.

SUMMARY OF THE INVENTION

A general object of the present invention is to make further improvements in the inventions already disclosed by the present inventors.

Specifically, a first object of the present invention is to provide a process which, through hydrolysis of imide rings of a cross-linked polysuccinimide, can easily produce at high volumetric efficiency a cross-linked polyaspartic acid resin having high water absorbency.

A second object of the present invention is to provide a process for producing a cross-linked polyaspartic acid resin, which is equipped with excellent gel strength, is improved in the stickiness at gel surfaces and has high water absorbency, by removing water-soluble by-products in the purification of the resin.

A third object of the present invention is to provide a process which, through simple steps, can produce a cross-linked polysuccinimide useful as a precursor for a cross-linked polyaspartic acid resin.

A fourth object of the present invention is to provide a process for the production of a cross-linked polyaspartic acid resin, which in order to provide the cross-linked polyaspartic acid resin with excellent safety, permits an efficient reaction by using a basic amino acid, such as lysine or ornithine, as a cross-linking agent excellent in safety.

The first object can be achieved by a process for producing a cross-linked polyaspartic acid resin by subjecting imide rings of a cross-linked polysuccinimide to a hydrolysis reaction, wherein said hydrolysis reaction is conducted while controlling a swelling degree of a resin in a reaction system within a range of from 3 to 100 times.

The degree of gelation of the resin can be optimized provided that reaction conditions for the hydrolysis—such as the ratio of water to a water-miscible organic solvent, the concentration of a salt and temperature—are set so that the hydrolysis reaction is conducted while maintaining the swelling degree within the range of from 3 to 100 times. As a result, the hydrolyzing velocity can be accelerated to allow the hydrolysis reaction to proceed sufficiently. As a result, the resulting cross-linked polyaspartic acid resin is provided with improved water absorbency. In addition, stirring can be easily performed. This makes it possible to increase the resin concentration in the reaction system and hence to achieve a higher volumetric efficiency.

The second object can be attained by a process for the production of a cross-linked polyaspartic acid resin, which comprises washing or reprecipitating a gel of a feed cross-linked polyaspartic acid resin with water and/or a water-miscible organic solvent.

The washing or reprecipitation of the gel with water and/or the water-miscible organic solvent can provide the cross-linked polyaspartic acid resin with improved water absorbency and gel strength. This is believed to be attributable to elimination of water-soluble components contained in the gel of the resin and detrimental to properties of the resin, such as monomers, oligomers, and an inorganic or organic salt.

The third object can be accomplished by a process for the production of a cross-linked polysuccinimide resin, which comprises reacting a feed polysuccinimide, which has been brought into a dispersed state by a dispersant, with a cross-linking agent.

When the cross-linking reaction of the feed polysuccinimide is conducted with the feed polysuccinimide maintained in the dispersed state as described above, it is possible to omit a process control which would otherwise be required to avoid over-gelation and, moreover, to allow the cross-linking reaction to proceed well. The cross-linked polysuccinimide, which is useful as a precursor for a cross-linked polyaspartic acid resin having (bio)degradability and high water absorbency, can therefore be produced at high productivity by the simple process.

The first and third objects can also be achieved by a process for the production of a cross-linked polyaspartic acid resin, which comprises disintegrating a gel of a cross-linked polysuccinimide, which has been gelled as a result of inclusion of an organic solvent in a cross-linking reaction, to subject remaining imide rings to hydrolysis although hydrolysis treatment of the gel has heretofore been very difficult.

The fourth object can be realized by a process for the production of a cross-linked polyaspartic acid resin, which comprises efficiently subjecting a polysuccinimide to a cross-linking reaction by using as a cross-linking agent a basic amino acid, such as lysine or ornithine, in the form of its carboxylate salt, preferably, its alkali metal or alkaline earth metal salt.

The cross-linked polyaspartic acid resin available in accordance with the present invention is compatible with the global environment owing to its biodegradation after its use, and is therefore very useful as a superabsorbent polymer for disposable diapers, agricultural or horticultural applications or the like.

DETAILED DESCRIPTION OF THE INVENTION AND PREFERRED EMBODIMENTS

[1] Structure of the cross-linked polyaspartic acid resin

Roughly dividing, the polymer according to the present invention is structurally composed of a backbone basic skeleton, side chain portions and cross-linking portions. These three constituents will hereinafter be described separately.

[1-1] Structure of the backbone basic skeleton of the cross-linked polyaspartic acid resin Recurring units of the backbone basic skeleton of the cross-linked polyaspartic acid resin produced in the present invention may be formed of aspartic acid residual groups alone or may be a copolymer of aspartic acid and an amino acid other than aspartic acid. Incidentally, the recurring units of aspartic acid in the polymer is called "a polyaspartic acid residual group" in the present invention irrespective of the style of bonding.

Specific examples of the amino acid other than aspartic acid can include 19 types of indispensable amino acids with the exception of aspartic acid, L-ornithine, a series of α-amino acids, β-alanine, γ-aminobutyric acid, neutral amino acids, acidic amino acids, ω-esters of acidic amino acids, basic amino acids, N-substituted derivatives of basic amino acids, aspartic acid-L-phenylalanine dimer (aspartame); and aminosulfonic acids such as L-cysteic acid. Each α-amino acid may be in the form of either an optically active substance (L-form or D-form) or a racemic modification.

Further, the polymer may be a copolymer containing recurring units other than an amino acid.

Illustrative of the recurring units of the copolymer can be dehydrating condensation products of aminocarboxylic acids, aminosulfonic acids, aminophosphonic acids, hydroxycarboxylic acids, mercaptocarboxylic acids, mercaptosulfonic acids, mercaptophosphonic acids, and the like.

Also included can be hydrating condensation products, addition products and substituted derivatives of polyamines, polyhydric alcohols, polythiols, polycarboxylic acids, polysulfonic acids, polyphosphoric acids, polyhydrazine compounds, polycarbamoyl compounds, polysulfonamide compounds, polyphosphonamide compounds, polyepoxy compounds, polyisocyanate compounds, polythioisocyanate compounds, polyaziridine compounds, polycarbamate compounds, polycarbamic acid compounds, polyoxazoline compounds, compounds containing multivalent reactive unsaturated bonds, multivalent metals, and the like.

In the case of a copolymer, it can be either a block copolymer or a random copolymer. The copolymer can also be a graft copolymer.

No particular limitation is imposed on the number of recurring units composed of polyaspartic acid residual groups, but based on the total number of the recurring number making up the molecule, 1 to 99.8% is preferred with 10 to 99.8% being more preferred.

As the recurring units of the backbone basic skeleton of the cross-linked polyaspartic acid resin, they may preferably be formed of aspartic acid residual groups alone or of a copolymer with glutamic acid or lysine from the standpoint of providing high water absorbency. From the viewpoint of industrial production, it is particularly preferred that the recurring units are composed of aspartic acid residual groups alone.

Amide bonds in a backbone basic skeleton of polyaspartic acid can be either α-bonds or β-bonds Namely, in the case of polyaspartic acid or a copolymer thereof, an α-bond is formed when an amino group or the like in aspartic acid or a monomer of the copolymer is bonded with the α-carboxyl group of aspartic acid, whereas a β-bond is formed when the amino group or the like is bonded with the β-carboxyl group of the aspartic acid.

Such α-bonds and β-bonds are generally found together in polyaspartic acid. No particular limitation is imposed on the style of bonding.

Side chain groups and cross-linking groups in the present invention are basically carboxylic acid derivatives formed as a result of substitution of carboxyl groups in polyaspartic acid. A description will hereinafter be made about their details.

[1-2] Structure of the side chains in the cross-linked polyaspartic acid resin

Each side chain in the cross-linked polyaspartic acid resin have a structure formed by subjecting an imide ring in the cross-linked polysuccinimide to ring-opening through hydrolysis, and contains a carboxyl group formed by the hydrolysis. The cross-linked polyaspartic acid resin may additionally contain side chains which contain other substituent groups. Examples of such other substituent groups can include, but are not limited to, pendant groups which contain one or more of hydroxyl, amino, mercapto, carboxyl, sulfonic, phosphonic, alkyl, aryl, aralkyl and like groups. The pendant groups may be alkyl, aryl or aralkyl groups which have no substituent group. These pendant groups are connected to the polyaspartic acid residue group via amide, ester, thioester or like bonds.

Each carboxyl group formed by hydrolysis may be in the free form or in the form of a salt. Specific examples of an ion which forms the salt can include alkali metal ions such as sodium, potassium, and lithium ions; ammonium ions such as ammonium, tetramethylammonium, tetraethylammonium, tetrapropylammonium, tetrabutylammonium, tetrapentylammonium, tetrahexylammonium, ethyltrimethylammonium, trimethylpropylammonium, butyltrimethylammonium, pentyltrimethylammonium, hexyltrimethylammonium, cyclohexyltrimethylammonium, benzyltrimethylammonium, triethylpropylammonium, triethylbutylammonium, triethylpentylammonium, triethylhexylammonium, cyclohexyltriethylammonium, and benzyltriethylammonium ions; and amine ions such as trimethylamine, triethylamine, tripropylamine, tributylamine, tripentylamine, trihexylamine, triethanolamine, tripropanolamine, tributanolamine, tripentanolamine, trihexanolamine, dimethylamine, diethylamine, dipropylamine, dibutylamine, dipentylamine, dihexylamine, dicyclohexylamine, dibenzylamine, ethylmethylamine, methylpropylamine, butylmethylamine, metylpentylamine, methylhexylamine, methylamine, ethylamine, propylamine, butylamine, pentylamine, hexylamine, octylamine, decylamine, dodecylamine, and hexadecylamine ions.

Among these ions, those having smaller atomic or molecular weights are preferable because, as the atomic or molecular weight of an ion increases, the molecular weight per monomer unit relatively becomes greater and the water absorption per unit weight relatively becomes smaller. Where there is possibility of being brought into contact with human skin or the like, those having lower toxicity are desirable, meaning that use of sodium, potassium, lithium, ammonium or triethanolamine is preferred and further that use of sodium or potassium is particularly preferred from the standpoint of cost.

[1-3] Structure of the cross-linking portions in the cross-linked polyaspartic acid resin Concerning the cross-linking portions in the cross-linked polyaspartic acid resin, no particular limitation is imposed on their molecular structures. The cross-linking portions in the cross-linked polyaspartic acid resin can be discussed by dividing each of them into a "bonded portion" bonded to the basic skeleton of the polymer backbone and a "linkage portion" cross-linking the bonded portions. A description will hereinafter be made about these divided portions.

[1-3-1] Bonded portions in the cross-linking portions in the cross-linked polyaspartic acid resin No particular limitation is imposed on the bonded portions in the cross-linking portions in the cross-linked polyaspartic acid resin. Their specific examples can include structures formed of an amide bond, an ester bond and a thioester bond, respectively. Structures of only one type may be contained, or structures of plural types may be contained together.

[1-3-2] Linkage portions in the cross-linking portions in the cross-linked polyaspartic acid resin No particular limitation is imposed on the linkage portions in the cross-linking portions in the cross-linked polyaspartic acid resin. The followings are specific examples of such linkage portions.

—$CH_2$—, —$CH_2CH_2$—, —$CH_2CH_2CH_2$—, —$CH_2CH_2CH_2CH_2$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{11}$—, —$(CH_2)_{12}$—, —$(CH_2)_{13}$—, —$(CH_2)_{14}$—, —$(CH_2)_{15}$—, —$(CH_2)_{16}$—, —$(CH_2)_{17}$—, —$(CH_2)_{18}$—, —$CH_2CH_2O$—$CH_2CH_2$—, —$(CH_2CH_2O)_2CH_2CH_2$—, —$(CH_2CH_2O)_3CH_2CH_2$—, —$(CH_2CH_2O)_4CH_2CH_2$—, —$(CH_2CH_2O)_5CH_2CH_2$—, —$(CH_2CH_2O)_6$—$CH_2CH_2$—, —$CH_2CH_2CH_2OCH_2CH_2CH_2$—, —$(CH_2CH_2CH_2O)_2CH_2CH_2CH_2$—, —$(CH_2CH_2CH_2O)_3CH_2CH_2CH_2$—, —$(CH_2CH_2CH_2O)_4CH_2CH_2CH_2$—, —$(CH_2CH_2CH_2O)_5CH_2CH_2CH_2$—, —$(CH_2CH_2CH_2O)_6CH_2CH_2CH_2$—,

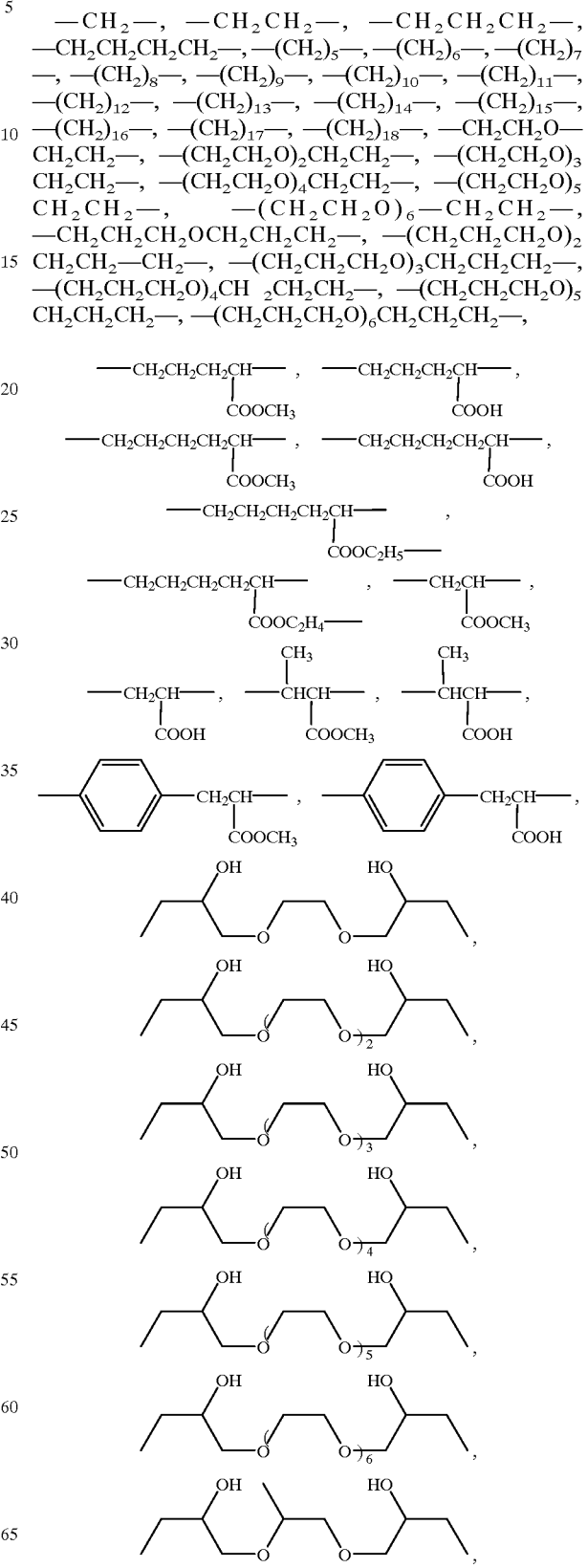

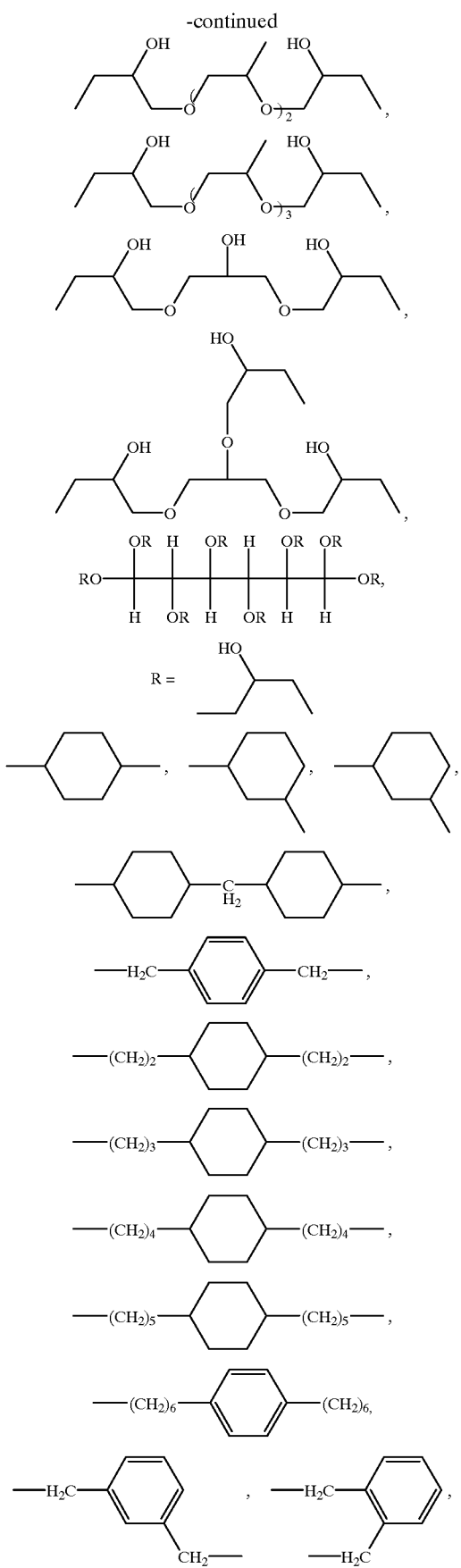

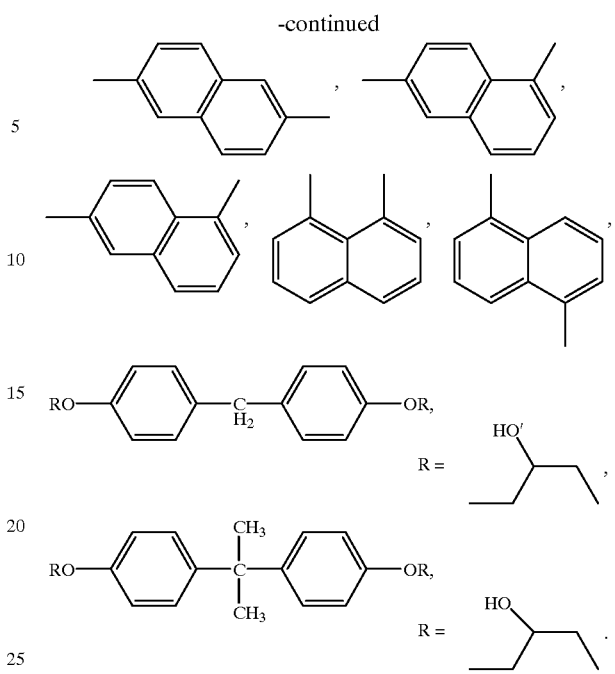

These linkage portions may be in unsubstituted forms or in forms substituted by substituted groups. Illustrative examples of the substituent groups can include linear or branched alkyl groups having 1–18 carbon atoms; cycloalkyl groups having 3–8 carbon atoms; aralkyl groups; substituted or unsubstituted phenyl groups; substituted or unsubstituted naphthyl groups; linear or branched alkoxy groups having 1–18 carbon atoms; aralkyloxy groups; phenylthio groups; linear or branched alkylthio groups having 1–18 carbon atoms; linear or branched alkylamino groups having 1–18 carbon atoms; dialkylamino groups in which each alkyl group is either linear or branched and has 1–18 carbon atoms; trialkylammonium groups in which each alkyl group is either linear or branched and has 1–18 carbon atoms; hydroxyl, amino, mercapto, carboxyl, sulfonic acid and phosphonic acid groups and salts thereof; alkoxycarbonyl groups; and alkylcarbonyloxy groups.

More specific examples can include alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl; cycloalkyl groups such as cyclopropyl, cyclobutyl, cyclopentyl, cyclohexyl, cycloheptyl, and cyclooctyl; aralkyl groups such as benzyl, phenylethyl, phenylpropyl, and phenylbutyl; phenyl groups such as phenyl, tolyl, xylyl, chlorophenyl, and biphenyl; naphthyl groups such as naphthyl and methylnaphthyl; alkoxy groups such as methoxy, ethoxy, propoxy, butoxy, pentyloxy, hexyloxy, heptyloxy, octyloxy, decyloxy, undecyloxy, dodecyloxy, tridecyloxy, tetradecyloxy, pentadecyloxy, hexadecyloxy, heptyldecyloxy, and octyldecyloxy; aralkyloxy groups such as phenoxy, benzyloxy, and tolyloxy; alkylthio groups such as methylthio, ethylthio, propylthio, butylthio, pentylthio, hexylthio, heptylthio, octylthio, nonylthio, decylthio, undecylthio, dodecylthio, tridecylthio, tetradecylthio, pentadecylthio, hexadecylthio, heptyldecylthio, and octyldecylthio; aralkylthio groups such as phenylthio, benzylthio, and tolylthio; alkylamino groups such as methylamino, ethylamino, propylamino, butylamino, pentylamino, hexylamino, heptylamino, octylamino, nonylamino, decylamino, undecylamino, dodecylamino, tridecylamino, tetradecylamino, pentadecylamino, hexadecylamino, heptyldecylamino, and octyldecylamino; dialkylamino groups such as dimethylamino, diethylamino, dipropylamino, dibutylamino, dipentylamino, dihexylamino, diheptylamino, dioctylamino, dinonylamino, didecylamino, diundecylamino, didodecylamino, ditridecylamino, ditetradecylamino, dipentadecylamino, dihexadecylamino, diheptyldecylamino, dioctyldecylamino, ethylmethylamino, and methylpropylamino; trialkylammonium groups such as trimethylammonio, triethylammonio, tripropylammonio, tributylammonio, tripentylammonio, trihexylammonio, triheptylammonio, trioctylammonio, trinonylammonio, tridecylammonio, triundecylammonio, tridodecylammonio, tridecylammonio, tritetradecylammonio, tripentadecylammonio, trihexadecylammonio, triheptyldecylammonio, trioctyldecylammonio, dimethylethylammonio, dimethylbenzylammonio, and methyldibenzylammonio; hydroxyl, amino, mercapto, carboxyl, sulfonic acid and phosphonic acid groups, and salts thereof; alkyloxycarbonyl groups such as methyloxycarbonyl, ethyloxycarbonyl, propyloxycarbonyl, butyloxycarbonyl, pentyloxycarbonyl, hexyloxycarbonyl, heptyloxycarbonyl, octyloxycarbonyl, nonyloxycarbonyl, decyloxycarbonyl, undecyloxycarbonyl, dodecyloxycarbonyl, tridecyloxycarbonyl, tetradecyloxycarbonyl, pentadecyloxycarbonyl, hexadecyloxycarbonyl, heptyldecyloxycarbonyl, and octyldecyloxycarbonyl; and alkylcarbonyloxy groups such as methylcarbonyloxy, ethylcarbonyloxy, propylcarbonyloxy, butylcarbonyloxy, pentylcarbonyloxy, hexylcarbonyloxy, heptylcarbonyloxy, octylcarbonyloxy, nonylcarbonyloxy, decylcarbonyloxy, undecylcarbonyloxy, dodecylcarbonyloxy, tridecylcarbonyloxy, tetradecylcarbonyloxy, pentadecylcarbonyloxy, hexadecylcarbonyloxy, heptyldecylcarbonyloxy, and octyldecylcarbonyloxy.

Selection of one having a smaller molecular weight from these illustrative substituent groups is preferred, because selection of one having a larger molecular weight leads to a cross-linking portion having a larger molecular weight, a relatively larger molecular weight per recurring unit, and hence, a smaller water absorption per unit weight. In general, it is also preferable to select a substituent group which permits a simpler production process. For example, unsubstituted linkage portions or linkage portions substituted by substituent groups (e.g., methyl, ethyl, methoxy, methyloxycarbonyl and/or methylcarbonyloxy groups; hydroxy, amino, mercapto, carboxyl, sulfonic acid and/or phosphonic acid groups, and/or salts thereof).

When the cross-linked polyaspartic acid resin is used as a water-holding material, inclusion of polar groups in the molecule of the resin is preferred. Accordingly, it is particularly preferred for the cross-linking portions either to be unsubstituted and to contain polar groups or to be substituted by polar-group-containing substituent groups (for example, hydroxyl, amino, mercapto, carboxyl, sulfonic acid and/or phosphonic acid groups, and/or salts thereof)

Although no particular limitation is imposed on the proportion of such cross-linking portions, recurring units with the cross-linking portions carried thereon may account, in number, preferably for 0.1 to 20%, more preferably 0.5 to 10% of entire recurring units of the polymer.

[2] Production process of the polysuccinimide

Although no particular limitation is imposed on the production process of the uncross-linked polysuccinimide useful in the practice of the present invention, a process reported in J. Amer. Chem. Soc., 80, 3361 et seq., 1958 or the like can be mentioned as a specific example.

No particular limitation is imposed on the molecular weight of the polysuccinimide to be used, but a higher molecular weight provides higher ability as a water-holding material. The molecular weight is generally 30,000 or higher, preferably 60,000 or higher, more preferably 90,000 or higher.

Further, the polysuccinimide can be in either a linear structure or a branched structure.

[3] Production process of the cross-linked polysuccinimide

Although no particular limitation is imposed on the production process of the cross-linked polysuccinimide employed in the practice of the present invention, illustrative exemplary processes can include a process in which a cross-linking agent is reacted to a solution of polysuccinimide in an organic solvent and a process in which polysuccinimide, which is in a form dispersed by a dispersant, and a cross-linking agent are reacted.

As the former process, reference may be had, for example, to JP Kokai 7-224163, in which a cross-linking agent is added to a solution of polysuccinimide in an organic solvent to conduct a cross-linking reaction. When this cross-linking reaction proceeds to a high cross-linking degree, the thus-crosslinked polysuccinimide is obtained in the form of a gel. This gel is then treated in a manner to be described subsequently herein.

On the other hand, the latter process is one of the characteristic features of the present invention. Namely, the reaction between polysuccinimide, which has been brought into a dispersed state by a dispersant, and a cross-linking agent in accordance with the present invention makes it possible to produce cross-linked polysuccinimide at high productivity by the simple process. As the dispersant, a poor solvent selected from the group consisting of organic solvents, which cannot achieve substantially complete dissolution of the polysuccinimide, and water is preferred.

As examples of the process in which polysuccinimide, which has been brought into a dispersed state by a poor solvent (for example, water and/or another poor solvent) as a dispersant, the following processes [3-1] to [3-5] can be mentioned.

[3-1] Polysuccinimide is brought into a dispersed state in a poor solvent as a dispersant and is then reacted with a cross-linking agent.

[3-2] Polysuccinimide is dissolved in a good solvent to prepare a polysuccinimide solution. This solution is mixed with a poor solvent as a dispersant, so that the polysuccinimide is brought into a dispersed state and is reacted with a cross-linking agent.

[3-3] A mixed solvent of a good solvent and a poor solvent as a dispersant is prepared. Polysuccinimide is added to this mixed solvent, and is brought into a dispersed state, followed by a reaction with a cross-linking agent.

[3-4] As a first step, polysuccinimide is dissolved in a good solvent to prepare a polysuccinimide solution, to which a cross-linking agent is added to allow a cross-linking reaction to proceed partially. As a second step, before the polysuccinimide is gelled by the cross-linking reaction in the first step, a poor solvent as a dispersant is added to bring the polysuccinimide into a dispersed state so that the cross-linking reaction is allowed to proceed further.

[3-5] Polysuccinimide is dissolved in a good solvent to prepare a polysuccinimide solution, to which a poor solvent as a dispersant is slowly added to bring the polysuccinimide into a dispersed state, followed by a reaction with a cross-linking agent.

According to the process [3-1], the polysuccinimide is brought into the dispersed state in the poor solvent as the dispersant. The polysuccinimide during the progress of the cross-linking reaction has been neither dissolved in nor swollen by the solvent. The process [3-2], on the other hand, is different in that the polysuccinimide is once dissolved in the good solvent and the resultant polysuccinimide solution and the poor solvent as the dispersant are mixed to disperse the polysuccinimide. In the process [3-2], the polysuccinimide during the progress of the cross-linking reaction is in the dispersed state and is in a form somewhat dissolved in or swollen by the good solvent. Compared with the process [3-1], the process [3-2] therefore allows the cross-linking reaction to proceed evenly with ease. Further, the dispersed state of the polysuccinimide is good because the once-dissolved polysuccinimide is finely dispersed by reprecipitation.

In the process [3-4], the addition of the poor solvent before the gelation is needed, because it becomes difficult to perform the dispersion by the dispersant once the polysuccinimide during the progress of the cross-linking reaction is gelled. Optionally, either before or after the addition of the cross-linking agent, a suitable amount of a poor solvent, an acid or the like may be added with a view to slowing down the cross-linking reaction for the prevention of gelation. Further, it is possible to conduct a hydrolysis reaction of imide rings in the cross-linked polysuccinimide in the first step and the second step.

Specific examples of the poor solvents employed in the processes [3-1] to [3-5] will be described subsequently herein. Especially in each of the processes [3-2] to [3-5], the good solvent and the poor solvent are used in combination so that these solvents preferably have mutual miscibility.

[4] Production conditions for the cross-linked polysuccinimide

A description will hereinafter be made about production conditions common to the above-described processes [3-1] to [3-5].

[4-1] Good solvent for use in the cross-linking reaction

The term "good solvent" as used therein should be interpreted to embrace therein organic solvents which can achieve substantially complete dissolution of polysuccinimide.

No particular limitation is imposed on the good solvent for use in the present invention, but one having miscibility with a poor solvent employed in combination is preferred in general. Generally, it is preferred to use such a good solvent as permitting substantial dissolution of a cross-linking agent to be used. For example, a mixed solvent having higher polarity is preferred when a cross-linking agent having higher hydrophilicity is used, whereas a mixed solvent having lower polarity is preferred when a cross-linking agent having higher hydrophobicity is employed.

Specific examples of good solvents can include N,N-dimethylformamide, N,N-dimethylacetamide, N-methylpyrrolidone, N,N'-dimethylimidazolidinone, dimethylsulfoxide, and sulfolane. Of these, N,N-dimethylformamide and N,N-dimethylacetamide are particularly preferred for their high solubility of polysuccinimide. These solvents may be used either singly or in combination.

[4-2] Poor solvent for use in the cross-linking reaction

The term "poor solvent" as used herein should be interpreted to embrace organic solvents, which cannot achieve substantially complete dissolution of polysuccinimide, and water. In the present invention, this poor solvent can be suitably used as a dispersant.

No particular limitation is imposed on the poor solvent for use in the present invention. Any solvent can be used insofar as it is employed in general chemical reactions and has low solubility for polysuccinimide. When a poor solvent is used in combination with a good solvent, one having miscibility with the good solvent is preferred as the poor solvent. Like the good solvent described above, it is generally preferred to use such a poor solvent as permitting substantial dissolution of a cross-linking agent to be used.

Specific examples of poor solvents can include water; alcohols such as methanol, ethanol, propanol, isopropanol, butanol, pentanol, hexanol, heptanol, octanol, 2-methoxyethanol, and 2-ethoxyethanol; glycols such as ethylene glycol, diethylene glycol, triethylene glycol, propylene glycol, and dipropylene glycol; glycosolves such as methylglycosolve and ethylglycosolve; ketones such as acetone, methyl ethyl ketone, and methyl isobutyl ketone; cyclic ethers such as tetrahydrofuran and dioxane; petroleum ether; pentane; hexane; heptane; octane; cyclohexane; benzene; toluene; ethylbenzene; xylene; decalin; diphenyl ether; anisole; and cresol. Of these, water, methanol, ethanol, propanol and isopropanol are particularly preferred as then can dissolve cross-linking agents or carboxylate salts of amino acids. These solvents can be used either singly or in combination.

Incidentally, these poor solvents can also be used for purposes other than dispersing polysuccinimide, for example, for slowing down the cross-linking reaction.

[4-3] Mixing ratio of a good solvent to a poor solvent for use in the cross-linking reaction When a good solvent and a poor solvent are used in combination, no particular limitation is imposed on their mixing ratio. Use of the poor solvent in an appropriately large proportion results in the development of the effect of the poor solvent, whereby polysuccinimide is brought into a dispersed state and gelation can be avoided. On the other hand, use of the poor solvent in an adequately small proportion results in the development of the effect of the good solvent, so that polysuccinimide is brought into a uniformly dispersed state. Further, use of the poor solvent in such an adequately small proportion generally reduces the cost for solvent recovery and is hence advantageous economically.

As already mentioned above individually with respect to the good solvent and the poor solvent, it is generally preferred to use such good solvent and poor solvent as permitting substantial dissolution of a cross-linking agent, which is to be used, when combined into a mixed solvent.

[4-4] Concentration of polysuccinimide for use in the cross-linking reaction

No particular limitation is imposed on the concentration of polysuccinimide in the polysuccinimide-containing dispersion during the progress of the cross-linking reaction but, in general, a concentration of from 0.1 to 50 wt. % is preferred with a range of from 1 to 40 wt. % being particularly preferred.

[4-5] Particle size of polysuccinimide for use in the cross-linking reaction

Concerning the particle size of polysuccinimide in the dispersed state, a smaller particle size is preferred as the reaction is facilitated. Using as a standard the particle size (average particle diameter) of polysuccinimide in a dry form, the particle size is preferably 100 pm or smaller, more preferably 10 $\mu$m or smaller. When the particles of polysuccinimide are appropriately small as mentioned above, the cross-linking reaction is allowed to easily proceed to the inside so that, when hydrolysis is conducted subsequently, uncross-linked, water-soluble portions are reduced, thereby making it possible to prevent reductions in yield and performance.

In this regard, it is preferred for the minimization of an uneven cross-linking reaction to adopt such a method as positively realizing a more uniformly dispersed state of polysuccinimide by wet grinding. This wet grinding is very useful especially for the process [3-1]. Details of this wet grinding will be described in the explanation of disintegration.

[4-6] Cross-linking agent for use in the cross-linking reaction

No particular limitation is imposed on the cross-linking agent for use in the present invention, insofar as it is a polyfunctional compound having reactivity with imide rings in polysuccinimide. For example, polyfunctional compounds such as polyamines and polythiols can be mentioned. Their specific examples can include polyamines, for example, aliphatic polyamines such as hydrazine, ethylenediamine, propylenediamine, 1,4-butanediamine, pentamethylenediamine, hexamethylenediamine, heptamethylenediamine, octamethylenediamine, nonamethylenediamine, decamethylenediamine, undecamethylenediamine, dodecamethylenediamine, tetradecamethylenediamine, hexadecamethylenediamine, 1-amino-2,2-bis(aminomethyl)butane, tetraaminomethane, diethylenetriamine and triethylenetetramine, alicyclic polyamines such as norbornenediamine, 1,4-diaminocyclohexane, 1,3,5-triaminocyclohexane and isophoronediamine, aromatic polyamines such as phenylenediamine, tolylenediamine and xylylenediamine, basic amino acids, led by lysine and ornithine, and esters thereof, compounds formed as a result of bonding of two or more molecules of monoamino compounds through one or more disulfide bonds, such as cystamine, and derivatives thereof; aliphatic polythiols such as 1,2-ethanedithiol, 1,3-propanedithiol, 1,4-butanedithiol, 1,6-hexanedithiol and pentaerythritol; alicyclic polythiols such as cyclohexanedithiol; aromatic polythiols such as xylylenedithiol, benzenedithiol and toluenedithiol; and esters such as trimethylolpropane tris(thioglycolate), trimethylolpropane tris(3-mercaptopropionate), pentaerythritol tetrakis(thioglycolate) and pentaerythritol tetrakis-(3-mercaptopropionate) polythiol.

Other examples can include protein-constituting amino acids represented by lysine, cystine and ornithine, and salts and esters thereof; amino acids other than the protein-constituting amino acids, and salts and esters thereof, such as Nδ-(2-amino-2-carboxyethyl)ornithine, Nδ-(2-amino-2-carboxyethyl)-lysine, o-(2-amino-3-hydroxypropyl) homoserine, kynurenine, α,β-diaminosuccinic acid, α,ε-diamino-pimelic acid, 2,6-diamino-7-hydroxyazelaic acid, isolysine, 3,5-diaminohexanoic acid, α,γ-diaminobutyric acid, djenkolic acid, cystathionine, cystine disulfoxide, α,ε-diamino-β-hydropimelic acid, hypusine, γ-hydroxyornithine, α-hydroxylysine, lanthionine, lysinonorleucine, lysovitoxine, and loseanine; amino acid derivatives such as lysinetriamine; and polyamines formed by connecting molecules of amino-containing compounds, such as cystine and cystamine, via disulfide bonds.

When these polyamines are in the form of salts such as mineral acid salts such as hydrochlorides, sulfates or hydrobromides or organic acid salts such as p-toluenesulfonates or acetates, the mineral acid salts or organic acid salts can be used after neutralizing them in advance. When an amino acid in the form of a polyamine is used as a cross-linking agent, it is necessary to dissociate an intramolecular salt because, for the structure of the amino acid, each carboxyl group and its associated amino group are contained in the form of salt in the molecule. When the above-described amino acid is used as a polyamine, the polyamine should be used after converting each amino group into its free form by adding a base to the polyamine to neutralize each carboxyl group into a carboxylate salt. No particular limitation is imposed on the base to be used for the neutralization, but an alkali metal hydroxide such as sodium hydroxide or potassium hydroxide, an alkali metal carbonate such as sodium carbonate or potassium carbonate, an alkali metal hydrogencarbonate such as sodium hydrogencarbonate or potassium hydrogencarbonate, or an organic amine such as triethylamine, trimethylamine, triethanolamine, pyridine, N-methylmorpholine or picoline is generally employed.

Among these cross-linking agents, preferred are those having less odor and high reactivity with imide rings in polysuccinimide, that is, ethylenediamine, propylenediamine, 1,4-butanediamine, heptamethylenediamine, hexamethylenediamine, and cystamine. In addition, protein-constituting amino acids such as lysine, ornithine and cystine, and salts and ester derivatives thereof; amino acids other than the protein-constituting amino acids, such as α-hydroxylysine, γ-hydroxyornithine and α,γ-diaminobutyric acid, and salt and ester derivatives thereof; amino acid derivatives such as lysinetriamine; and cystamine are also preferred, because resulting cross-linked polyaspartic acid resins are safe to living organisms and the environment after their degradation and/or biodegradation. Among these, lysine, ornithine and cystine and their derivatives such as salts and esters are particularly preferred as they are inexpensive and are readily available.

They can be used either singly or in combination.

For the cross-linked polyaspartic acid resin according to the present invention, use of a basic amino acid as a cross-linking agent is also preferred from the standpoint of safety.

Although no particular limitation is imposed on the basic amino acid, it can be represented generally by the following formula (1):

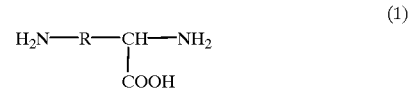

wherein R represents an alkylene, aralkylene or arylene group.

The alkylene, aralkylene or arylene group as R can be of either a linear or a branched structure or of a cyclic structure. Further, some of its carbon atoms may be substituted by substituent groups which contain O, N, S, P, B, Si or the like. Namely, the alkylene, aralkylene or arylene group may be substituted by one or more substituent groups containing O, N, S, P, B, Si or the like, such as ether, ester, carbonyl, urea, thioester, thiocarbonyl, sulfone, sulfonyl, sulfonamido, secondary amino, tertiary amino, amido, phosphonic or phosphonamido groups. Further, no particular limitation is imposed on the substituting position of the amino group to R. Further, R may contain one or more substituent groups such as alkyl, cycloalkyl, aralkyl, aryl, alkoxyalkyl, polyoxyalkylene, aryloxyalkylene, aralkyloxyalkyl, alkylthioalkyl, polythioalkylene, arylthioalkylene, aralkylthioalkyl, alkylamino, dialkylamino, trialkylammonio, alkyloxycarbonylalkyl, and/or alkylcarbonyloxyalkyl groups.

The followings are specific examples of R.

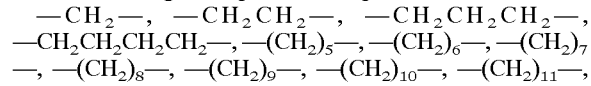

—(CH₂)₁₂—, —(CH₂)₁₃—, —(CH₂)₁₄—, —(CH₂)₁₅—, —(CH₂)₁₆—, —(CH₂)₁₇—, —(CH₂)₁₈—, —CH₂CH₂O—CH₂CH₂—, —(CH₂CH₂O)₂CH₂CH₂—, —(CH₂CH₂O)₃CH₂CH₂—, —(CH₂CH₂O)₄CH₂CH₂—, —(CH₂CH₂O)₅CH₂CH₂—, —(CH₂CH₂O)₆—CH₂CH₂—, —CH₂CH₂CH₂OCH₂CH₂CH₂—, —(CH₂CH₂CH₂O)₂CH₂CH₂—CH₂—, —(CH₂CH₂CH₂O)₃CH₂CH₂CH₂—, —(CH₂CH₂CH₂O)₄CH₂CH₂CH₂—, —(CH₂CH₂CH₂O)₅CH₂CH₂CH₂—, —(CH₂CH₂CH₂O)₆CH₂CH₂CH₂—,
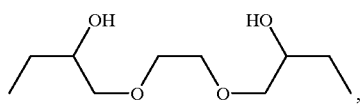
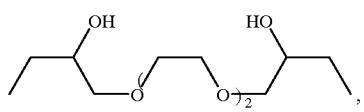
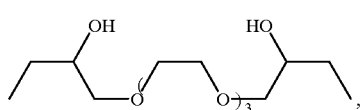
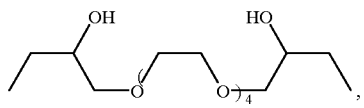
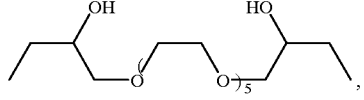
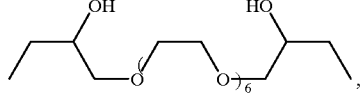
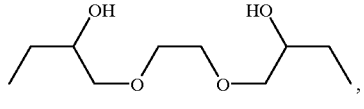
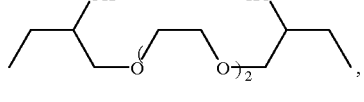
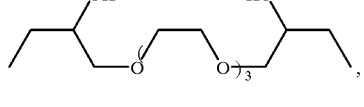
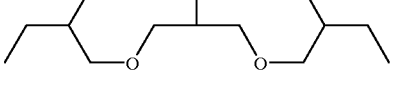
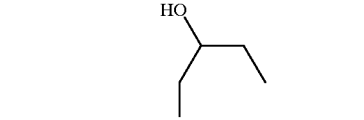
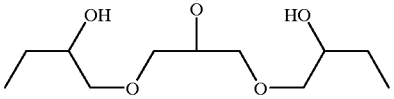
-continued
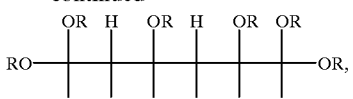
R =
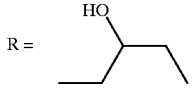
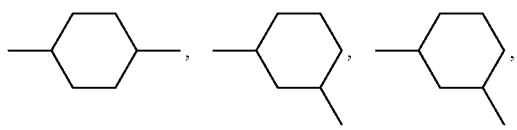
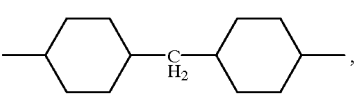
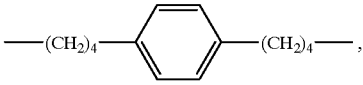
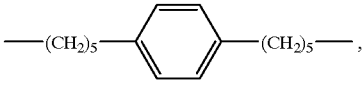
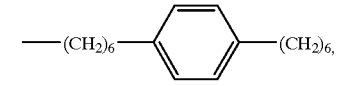
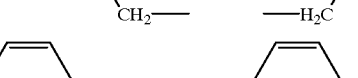
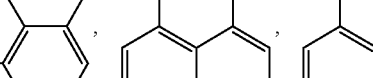
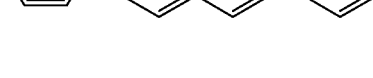
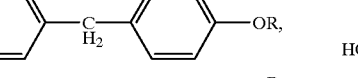
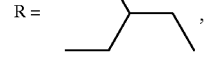

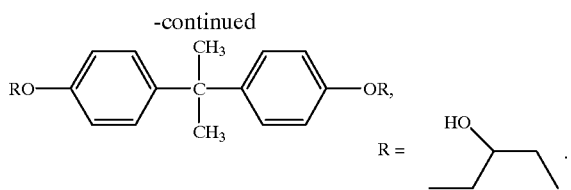

Further, amino acid dimers and basic polyamino acids such as polylysine can also be used. Among these, lysine and ornithine are preferred.

Although no particular limitation is imposed on the manner of use of such a basic amino acid as a cross-linking agent in the present invention, the α-amino group and the carboxyl group take an amphoteric ion structure as shown in Formula (2) if the basic amino acid is used as is. In this case, the reactivity of the α-amino group is lowered so that the reaction velocity of the basic amino acid as a cross-linking agent becomes very low.

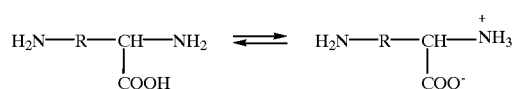
(2)

wherein R has the same meaning as defined above.

In the reaction, the basic amino acid is therefore used in the form of a derivative such as an ester, thioester or amide or as one of the characteristic features of the present invention, in the form of its carboxylate salt as represented by the below-described formula (3) or (4). By using its derivative or its carboxylate salt, the reactivity of the α-amino group is increased so that it acts effectively as a cross-linking agent.

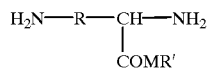
(3)

wherein R has the same meaning as defined above, R' represents an alkyl, aralkyl or aryl group, and M represents —NH—, —N(R")—, R" being an alkyl, aralkyl or aryl group, —S— or —O—.

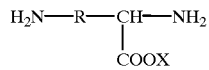
(4)

wherein R has the same meaning as defined above, and X represents an alkali metal ion, an alkaline earth metal ion or an ammonium ion.

No particular limitation is imposed on the alcohol, thiol or amine component of the basic amino acid ester, thioester or amide for use in the present invention, but one having a smaller molecular weight is preferred. On the other hand, no particular limitation is imposed on the ion which forms the salt with the carboxylic acid of the basic amino acid for use in the practice of the present invention.

Specific examples of the ion which forms the carboxylate salt can include alkali metal ions such as sodium, potassium, and lithium ions; ammonium ions such as ammonium, tetramethylammonium, tetraethylammonium, tetrapropylammonium, tetrabutylammonium, tetrapentylammonium, tetrahexylammonium, ethyltrimethylammonium, trimethylpropylammonium, butyltrimethylammonium, pentyltrimethylammonium, hexyltrimethylammonium, cyclohexyltrimethylammonium, benzyltrimethylammonium, triethylpropylammonium, triethylbutylammonium, triethylpentylammonium, triethylhexylammonium, cyclohexyltriethylammonium, and benzyltriethylammonium ions; and amine ions such as trimethylamine, triethylamine, tripropylamine, tributylamine, tripentylamine, trihexylamine, triethanolamine, tripropanolamine, tributanolamine, tripentanolamine, trihexanolamine, dimethylamine, diethylamine, dipropylamine, dibutylamine, dipentylamine, dihexylamine, dicyclohexylamine, dibenzylamine, ethylmethylamine, methylpropylamine, butylmethylamine, methylpentylamine, methylhexylamine, methylamine, ethylamine, propylamine, butylamine, pentylamine, hexylamine, octylamine, decylamine, dodecylamine, and hexadecylamine ions.

Among these ions, those having smaller atomic or molecular weights are preferred because a greater atomic or molecular weight leads to a relatively greater molecular weight per monomer unit and hence to a smaller water absorption per unit weight. Further, those having lower toxicity are preferred when the resulting cross-linked polyaspartic acid resin has possibility of being brought into contact with human skin or the like. For these reasons, it is preferred to use sodium, potassium, lithium, ammonium or triethanolamine. Use of sodium or potassium is particularly preferred from the standpoint of cost.

[4-7] Amount of the cross-linking agent to be employed in the cross-linking agent The amount of the cross-linking agent is not particularly limited, and can be determined as needed depending on the cross-linking degree of the resulting cross-linked resin, said cross-linking degree being governed by the number of functional groups in the cross-linking agent and the molecular weight of the cross-linking agent, and also on the application purpose of the resulting cross-linked resin. Here, the term "cross-linking degree" as used herein is defined to indicate the distance or the number of constituent monomer units between adjacent cross-links or the proportion of cross-linking portions relative to the polymer backbone.

In general, an unduly large amount of a cross-linking agent leads to an excessively high cross-linking degree, resulting in reduced water absorbency when formed into a cross-linked polyaspartic acid resin. An unduly small amount of a cross-linking agent, on the other hand, leads to an excessively low cross-linking degree, resulting in a polyaspartic acid resin which has been cross-linked only partially, is water-soluble and does not exhibit water absorbency. The amount of the cross-linking agent can therefore be determined such a way as needed to achieve an appropriate cross-linking degree. In general, the amount of the cross-linking agent may preferably be from 0.1 to 30%, notably from 1–20% based on the total of monomer units in the polysuccinimide.

[4-8] Catalyst for use in the cross-linking agent

In the cross-linking reaction, a catalyst may be used as needed. As the catalyst, a basic catalyst is generally used.

Illustrative of the basic catalyst are inorganic basic reagents, for example, alkali metal hydroxides such as sodium hydroxide, potassium hydroxide and lithium hydroxide, alkali metal carbonates such as sodium carbonate, potassium carbonate and lithium carbonate, alkali metal hydrogencarbonates such as sodium hydrogencarbonate and potassium hydrogencarbonate, alkali metal acetates such as sodium acetate and potassium acetate, alkali metal salts such as sodium oxalate, and ammonia; and organic basic reagents, for example, amines such as trimethylamine, triethylamine, tripropylamine, tributylamine, tripentylamine, trihexylamine, triethanolamine, tripropanolamine, tributanolamine, tripentanolamine, trihexanolamine, dimethylamine, diethylamine, dipropylamine, dibutylamine, dipentylamine, dihexylamine, dicyclohexylamine, dibenzylamine, ethylmethylamine, methylpropylamine, butylmethylamine, methylpentylamine, methylhexylamine, methylamine, ethylamine, propylamine, butylamine, pentylamine, hexylamine, octylamine, decylamine, dodecylamine, hexadecylamine, pyridine, picoline, and quinoline.

[4-9] Reaction temperature of the cross-linking reaction

The reaction temperature of the cross-linking reaction is not particularly limited, and can be determined as needed in view of the reactivity of the cross-linking agent and the state of dispersion of the polysuccinimide. In generally, it may preferably be from 0 to 200° C., with 10–80° C. being more preferred.

[4-10] Procedures after the cross-linking reaction

After the completion of the cross-linking reaction, the process may proceed to the next hydrolysis step as is without separation of the organic solvent employed in the cross-linking reaction, or alternatively, may proceed to the next hydrolysis step after the cross-linked polysuccinimide is isolated by separating the organic solvent.

The separation between the cross-linked polysuccinimide and the organic solvent can be conducted by a method known per se in the art. For example, filtration, decantation, centrifugal separation or the like can be adopted.

[5] Cross-linking method of polysuccinimide in a dispersed state for the production of a cross-linked polyaspartic acid resin with an increased water absorption speed In the process of the present invention for obtaining a cross-linked polysuccinimide by reacting polysuccinimide, which has been brought into a dispersed state by a dispersant, with a cross-linking agent, sufficient control of the reaction step makes it possible to obtain a cross-linked polyaspartic acid resin having a high water absorption speed when the imide rings of the cross-linked polysuccinimide are hydrolyzed.

Examples of this method can include, but not particularly limited to, the following three methods:

[5-1] To control the manner of charging of a cross-linking agent and a dispersant.

[5-2] To introduce a cross-linking agent as pendant groups into the polymer backbone, followed by cross-linking of the pendant groups.

[5-3] To react an internal cross-linking agent to polysuccinimide and then to have a surface cross-linking agent reacted for achieving cross-linking.

Although no particular limitation is imposed on how to actually conduct these methods, specific examples of the individual methods will hereinafter be described.

[5-1'] To a solution of polysuccinimide in a good solvent, a dispersant and a cross-linking agent are added at the same time, and cross-linking is then conducted while creating a dispersed state.

[5-2'] To a solution of polysuccinimide in a good solvent, a cross-linking agent is added for its introduction as pendant groups. A dispersant is then charged to bring the reaction system into a dispersed state, followed by the addition of a base to conduct a cross-linking reaction.

[5-3] To a solution of polysuccinimide in a good solvent, an internal cross-linking agent is added to conduct cross-linking. Either after bring the reaction system into a dispersed state by adding a dispersant or concurrently with the addition of the dispersant, a surface cross-linking agent is added further to conduct a cross-linking reaction.

These methods [5-1] to [5-3] are all intended to provide the resulting resin with a gradient or a difference in cross-link density between its inner part and its outer part. In particular, provision of an increased cross-linking degree to a resin surface makes it possible to achieve an excellent water absorption speed when the resin is used as a super-absorbent polymer. This is one of the characteristic features of the present invention.

The conditions described above under [3] and [4] apply likewise to these methods. A description will hereinafter be made about conditions different from the above-mentioned ones.

[5-1] How to control the manner of charging of a cross-linking agent and a dispersant This method is to produce an excellent resin by controlling the manner of charging (including the timing of charging) of the cross-linking agent and the dispersant.

In this method, the cross-linking agent and the dispersant are added at the same time to a solution of polysuccinimide in a good solvent, and a cross-linking reaction is initiated while bringing the reaction system into a dispersed state. The cross-linking agent and the dispersant may be added at the same time through different inlets, respectively, or may be added through a single inlet after either mixing or dissolving them in advance. As a still further alternative, the cross-linking agent may be dissolved in a suitable organic solvent or water and may then be added in a similar manner as the above-described manner. No particular limitation is imposed on the suitable organic solvent insofar as it can achieve substantially complete dissolution of the cross-linking agent. No particular limitation is imposed either on the amount of the organic solvent to be used.

Upon concurrent addition of the cross-linking agent and the dispersant, the rate of their addition is not particularly limited, but in general, they are charged dropwise over 10 minutes to 3 hours. A considerably fast addition rate such as that observed, for example, upon adding them at once leads not only to the development of substantial heat in the reaction system but also to a failure in obtaining a good dispersed state. If it takes more than 3 hours for charging them, the productivity is lowered.

In this method, a catalyst may also be used, as needed, upon conducting the cross-linking reaction. In this case, no particular limitation is imposed on the timing of its addition.

[5-2] How to introduce a cross-linking agent as pendant groups into a polymer backbone and then to have the pendant groups cross-linked This method is to achieve cross-linking of polysuccinimide by first reacting the polysuccinimide with only one of reactive groups of a cross-linking agent to introduce it as pendant groups and then activating the other reactive group to react and cross-link the pendant groups together. The cross-linking agent employed in this method may be one having reactive groups of equivalent reactivity, but one having two or more reactive groups of different reactivities is particularly preferred.

As examples of the cross-linking agent, the basic amino acids exemplified above under [4] can be mentioned.

In each of the amino acids, such as lysine or ornithine, out of the cross-linking agents usable in the present invention, one of the two amino groups is in a form associated with the carboxyl group through a hydrogen bond. Structurally, it is hence a monofunctional amine. In this form, it does not function as a cross-linking agent. Through a reaction with polysuccinimide, it can be introduced as pendant groups into the polymer. Addition of a base to the polysuccinimide with such pendant groups introduced therein results in neutralization of each carboxylic acid which has formed a hydrogen bond with the other amino group, whereby the amino group becomes free and reacts with an imide ring. In this manner, the cross-linking reaction proceeds. In the present invention, the above-mentioned amino acid is therefore added to a solution of polysuccinimide in such a form that only one amino group in its molecule becomes free. For example, a diaminomonocarboxylic acid such as lysine is added as is but, when a mineral acid salt of a diaminomonocarboxylic acid, such as lysine monochloride, is used, only the mineral acid is neutralized. In this manner, one of the amino groups is rendered free and is introduced as a pendant group into the polysuccinimide. When ornithine methyl or the like is used, for example, a cross-linking reaction would undesirably take place if it were used as is. It is therefore used in the form of the monochloride, that is, with one amino group blocked in an inactive form, for the reaction.

The term "pendant groups" as used herein means that a compound having a functional group, which has reactivity with an imide rings in polysuccinimide, has opened the imide ring and is in a form "pendant" relative to the backbone of the polysuccinimide.

In this method, the cross-linking reaction may be conducted, for example, through the following three stages.

(1) A cross-linking agent is introduced as pendant groups.
(2) The reaction system is brought into a dispersed state to keep it free from a potential problem of gelation even when the cross-linking reaction proceeds.
(3) A base is added to activate the cross-linking agent introduced as pendant groups, whereby the cross-linking reaction is initiated.

No particular limitation is imposed on the base which is employed to activate the cross-linking agent introduced as pendant groups, insofar as it can dissociate hydrogen bonds between amino groups and carboxyl groups. Illustrative are alkali metal hydroxides such as sodium hydroxide, potassium hydroxide and lithium hydroxide; alkali metal acetates such as sodium acetate and potassium acetate; and tertiary amines such as trimethylamine, triethylamine, tripropylamine, tributylamine, tripentylamine, trihexylamine, triethanolamine, tripropanolamine, tributanolamine, tripentanolamine, trihexanolamine, N-methylmorpholine, pyridine, quinoline, and picoline.

To have the cross-linking agent, which have been introduced as pendant groups, reacted substantially in its entirety, it is necessary to use the base in a molar amount equivalent to carboxyl groups contained in the pendant groups. It is however possible to control the cross-linking degree by adjusting the amount of the base to be used. Namely, when a base is caused to act in an amount smaller than the carboxyl groups in the cross-linking agent introduced as pendant groups, the resulting cross-linking degree is lower than that calculated from the amount of the cross-linking agent so that a portion of the cross-linking agent still remains as pendant groups. Accordingly, the above-mentioned preferred amount of the cross-linking agent means, in a narrow sense, an amount of the base required to activate the cross-linking agent.

[5-3] How to react an internal cross-linking agent with polysuccinimide and then to react a cross-linking agent for conducting cross-linking According to this method, polysuccinimide is first reacted with an internal cross-linking agent, and a surface-crosslinking agent is then reacted for conducting cross-linking. Compared with the methods [5-1] and [5-2], this method [5-3] can more easily develop a difference or gradient in cross-link density between an inner part and an outer part of each resin particle.

This method can also make use of the principles of the method [5-1] and [5-2].

The term "internal cross-linking agent" as used herein means a cross-linking agent which is reacted to polysuccinimide in a homogeneous system before the addition of a dispersant. On the other hand, the term "surface cross-linking agent" means a cross-linking agent which is reacted with polysuccinimide in a dispersed state after the addition of a dispersant.

As has already been explained in connection with the process [5-2], when a (polyamino)polycarboxylic acid, which has been neutralized beforehand with a base and contains at least two amino groups (i.e., a polyamine containing at least one carboxyl group in a molecule), and/or a conventional polyamine or polythiol is used as a cross-linking agent, it induces a cross-linking reaction as an ordinary cross-linking agent, and, when a (polyamino) polycarboxylic acid in which one amino group is free is used, it is first introduced as pendant groups. Therefore, this process [5-3] will hereinafter be described by dividing it into two sections depending upon which one of these two types of cross-lining agents is used as an internal cross-linking agent.

[5-3-1] Use of a (polyamino)polycarboxylic acid, which has been neutralized beforehand with a base and contains at least two amino groups (i.e., a polyamine containing at least one carboxyl group in a molecule), and/or a conventional polyamine or polythiol an internal cross-linking agent In this method, the cross-linking reaction may be conducted, for example, through the following three stages.

(1) An internal cross-linking agent in such an amount as not causing gelation of the reaction system is reacted with polysuccinimide.
(2) A dispersant is charged to bring the reaction system into a dispersed state.
(3) A surface cross-linking agent is added further to conduct the cross-linking reaction.

The stages (2) and (3) may be effected at the same time. Namely, the surface cross-linking agent may be charged together with the dispersant into the reaction system or the surface cross-linking agent may be charged in a form dissolved in the dispersant. As the surface cross-linking agent in this method, one of the above-mentioned polyfunctional compounds having reactivity with imide rings, such as polyamines and polythiols, can be used.

In this case, no particular limitation is imposed on the amount of the cross-linking agent to be used (the total amount of the internal cross-linking agent and/or the surface cross-linking agent to be used), and a suitable amount can be chosen in accordance with a target cross-linking degree. The term "cross-linking degree" as used herein means a proportion of cross-linking portions relative to the polymer backbone. In general, an unduly large amount of a cross-linking agent leads to an excessively high cross-linking degree, resulting in reduced water absorbency when formed into a superabsorbent polymer. An unduly small amount of a cross-linking agent, on the other hand, leads to an excessively low cross-linking degree, resulting in a polyaspartic acid which has been cross-linked only partially, is water-soluble and does not exhibit water absorbency. The amount of the cross-linking agent (the total amount of the internal cross-linking agent and/or the surface cross-linking agent) is therefore adjusted to generally account for 0.1 to 30 mole % of the total number of monomer units in the backbone of the polysuccinimide. The amount of the internal cross-linking agent referred to in the above description of step (1) as not causing the gelation of the reaction system is generally from 0.01 to 3 mole % based on the total number of monomer units in the backbone of the polysuccinimide, although it varies depending on the kind of the cross-linking agent, the reaction temperature and the molecular weight of the polysuccinimide. Namely, the cross-linking reaction is conducted to a cross-linking degree of from about 0.01 to 3% in a homogeneous system and, after the reaction is brought into a dispersed state by a dispersant or concurrently with dispersion of the reaction system, the surface cross-linking agent is added in an amount sufficient to give a cross-linking degree of from 0.1 to 30% in terms of an overall cross-linking degree including the cross-linking degree achieved by the internal cross-linking agent, and the cross-linking reaction is then continued further.

[5-3-2] Use of a (polyamino)polycarboxylic acid, in which only one amino group is free, as an internal cross-linking agent In this method, cross-linking may be conducted, for example, through the following four stages.

(1) An internal cross-linking agent is introduced as pendant groups.

(2) The reaction system is brought into a dispersed state to avoid a potential problem of gelation of the reaction system even when the cross-linking reaction proceeds.

(3) A base is added to activate the internal cross-linking agent introduced as the pendant groups, whereby the cross-linking reaction is conducted.

(4) A surface cross-linking agent is then added to perform surface cross-linking.

As the surface cross-linking agent, the above-mentioned polyfunctional compound having reactivity with imide rings, such as a polyamine or a polythiol, can be used.

In this case too, no particular limitation is imposed on the amount of the cross-linking agent to be used. However, the amount of the cross-linking agent is generally adjusted so that the sum of the internal cross-linking agent introduced as pendant groups and the surface cross-linking agent added after dispersion accounts for 0.1 to 30 mole % of the total number of monomer units in the backbone of the polysuccinimide. Although no particular limitation is imposed on the molar ratio of a surface cross-linking agent, which is to be added after dispersion, to an internal cross-linking agent to be introduced as pendant groups, a greater proportion of the surface cross-linking agent to be added after dispersion, in other words, a higher percentage of surface cross-linking tends to eventually result in a superabsorbent polymer which has a higher water absorption speed and conversely possesses a lower water absorption. A suitable molar ratio can therefore be chosen depending on the application purpose.

Concerning the kind and amount of the base to be used and the controllability of the cross-linking degree by the amount of the base to be used, the corresponding descriptions made above under [5-3-1] apply likewise.

In the case mentioned above under [5-3-2], no particular limitations are imposed on the reaction temperatures upon introducing the internal cross-linking agent as pendant groups, upon conducting cross-linking by the addition of the base, and upon performing surface cross-linking by the addition of the surface cross-linking agent. In general, however, these reactions are conducted at −10° C. to 200° C., preferably at 10° C. to 80° C. although they may vary depending on the reactivities of the cross-linking agents, the presence or absence of a catalyst, the molecular weight of polysuccinimide, and the like.

[6] Cross-linking method of polysuccinimide in a non-dispersed state

In the above description, the description was made about the process for producing a cross-linked polysuccinimide by reacting polysuccinimide, which has been brought into a dispersed state by a dispersant, with a cross-linking agent. According to the above process, a cross-linked polysuccinimide can be obtained at high productivity by the simple process.

It is however to be noted that the present invention includes not only the process featuring cross-linking of polysuccinimide in a dispersed state but also a process in which polysuccinimide in the form of a solution is cross-linked into a gel and the thus-obtained gel of the cross-linked polysuccinimide is then subjected to disintegration. As will be described subsequently herein, the present invention also encompasses a hydrolysis process featuring an adjustment of a swelling degree of a resin and, further, a process featuring washing and reprecipitation of a gel of a cross-linked polyaspartic acid resin with water and/or a water-miscible organic solvent.

These processes become more useful from the practical standpoint when they are carried out in combination with the process featuring cross-linking of polysuccinimide in a dispersed state or the process in which polysuccinimide in the form of a solution is cross-linked into a gel and the thus-obtained gel of the cross-linked polysuccinimide is subjected to disintegration. A description will hereinafter be made about a process for cross-linking polysuccinimide in a non-dispersed state. By the way, the term "non-dispersed state" as used herein means a uniform solution of polysuccinimide or a state not exactly the same as the solution but close to the solution so that a state, in which a cross-linking agent is not in a dissolved state but also in a dispersed state is embraced. Also included is a state in which a portion of polysuccinimide has not been dissolved and is precipitated.

In this case, polysuccinimide and a cross-linking agent are reacted in a good solvent, that is, an organic solvent having solubility for polysuccinimide. Illustrative are N,N-dimethylformamide, N,N-dimethylacetamide, N-methylpyrrolidone, N,N'-dimethylimidazolidinone, dimethylsulfoxide, and sulfolane. Among these, N,N-dimethylformamide and N,N-dimethylacetamide are particularly preferred for their high solubility of polysuccinimide. These solvents may be used either singly or in combination.

Further, with a view to slowing down the cross-linking reaction, it is also possible to add a poor solvent, which does not dissolve or can only sparingly dissolve polysuccinimide. As this poor solvent, those similar to the poor solvents exemplified above can be used.

The cross-linking reaction system is progressively gelled as the cross-linking reaction proceeds. The hydrolysis can be conducted either before the reaction system is entirely gelled or after the reaction system is completely gelled. The degree of gelation differs depending on reaction conditions such as the concentration of the polymer, the amount of the cross-linking agent, the cross-linking degree, and the proportion of a poor solvent if any. The resulting gel is hard under conditions such as a high polymer concentration, a large amount of the cross-linking agent, a high cross-linking degree or a low proportion of the poor solvent. The gel becomes soft in an opposite case. In this case, the gel to be formed is chosen in accordance with the application purpose of a cross-linked polyaspartic acid resin to be obtained through hydrolysis. To obtain a resin having high gel strength, for example, it is only necessary to increase the cross-linking degree. In the case of a soft gel, the gel can be disintegrated by dispersing it in a poor solvent or water as disclosed in JP Kokai 7-224163. In the case of a hard gel, however, this method cannot sufficiently disintegrate the gel in a short time, thereby making it difficult to conduct the hydrolysis. Very effective in this case is the process in which a gel of cross-linked polysuccinimide is subjected to disintegration as one of the characteristic features of the present invention. Namely, the cross-linked polysuccinimide as a reaction product after the cross-linking reaction turns to a gel swollen as a result of absorption of the organic solvent. It is preferable to use this gel after subjecting it to disintegration. In this case, the gel may be taken out subsequent to the cross-linking reaction and may then be charged into a wet-grinding mill, or the cross-linking reaction itself may be conducted in a wet-grinding mill and gelation may be conducted in the mill.

The wet-grinding of the cross-linked polysuccinimide, which pertains to the present invention, is effective even when the gel is soft, to say nothing of a soft gel, so that hydrolysis can be conducted in a short time.

[7] Disintegration

It is preferred to apply disintegration especially to a cross-linked polysuccinimide which has been obtained by cross-linking polysuccinimide in a non-dispersed state. In addition, it is also preferred to develop a more uniformly dispersed state by conducting a cross-linking reaction under disintegration, that is, wet grinding when cross-linking is conducted using polysuccinimide in a state dispersed by a dispersant as described above. Both the cases will hereinafter be described together.

The term "disintegration" as used herein should be interpreted to embrace an embodiment in which a material (a gel or the like) to be processed is disintegrated as is and an embodiment in which a material to be processed is ground in water and/or an organic solvent. Further, this term should also be interpreted to include "wet-grinding" as meant in an ordinary sense.

As a disintegrating operation, it is preferred to conducting disintegration in water and/or an organic solvent or to disintegrate the material, which is to be processed, as is and then to add a transport solvent (water and/or an organic solvent) to impart fluidity thereto in view of transportation and the like.

[7-1] Solvent for use in disintegration

No particular limitation is imposed on the solvent for use in disintegration. Solvents, which are commonly used for this purpose, are all usable. Specific examples can include water, N,N-dimethylformamide, N,N-dimethylacetamide, N-methylpyrrolidone, N,N'-dimethylimidazolidinone, dimethylsulfoxide, and sulfolane, alcohols such as methanol, ethanol, propanol, isopropanol, butanol, pentanol, hexanol, heptanol, octanol, 2-methoxyethanol and 2-ethoxyethanol, glycols such as ethylene glycol, diethylene glycol, triethylene glycol, propylene glycol and dipropylene glycol, glycosolves such as methylglycosolve and ethylglycosolve, ketones such as acetone, methyl ethyl ketone and methyl isobutyl ketone, cyclic ethers such as tetrahydrofuran and dioxane, petroleum ether, pentane, hexane, heptane, octane, cyclohexane, benzene, toluene, ethylbenzene, xylene, decalin, diphenyl ether, anisole, and cresol. These solvents can be used either singly or in combination.

[7-2] Grinding mill for use in disintegration

No particular limitation is imposed on the grinding mill (machine for disintegration) to be used, insofar as it can substantially disintegrate a solid, a gel-like material, a solid in a liquid, or a gel-like material in a liquid. As specific examples, those of the type that a stirring blade having cutting edges or an ordinary stirring blade is rotated at a high speed are preferred. To increase the efficiency of disintegration, a grinding mill equipped with baffles is also preferred. Further, a grinding mill having both disintegrating and transporting functions is preferred. No particular limitation is imposed on the shape of the stirring blade, and the stirring blade may be in the form of a screw blade or in the form of a ribbon-shaped or wire-shaped blade which remains rather free from large load.

Illustrative can be a pipeline homomixer, a homomix line mill, a goratol pump, a disintegrator, a mixer, a spike mill, a homogenizer, a meat chopper, a noodle-making machine, a coffee mill, a juicer mixer, a vortex mixer, a tumbler mixer and the like.

No particular limitation is imposed on the speed of rotation (rpm, revolutions per minute) of the stirring blade having cutting edges or the conventional stirring blade, insofar as disintegration is achieved practically. In general, a higher speed is preferred within a range in which the temperature of the grinding system does not rise by frictional heat. When the resin is employed in disposable diapers or for agricultural or horticultural purposes in the form of large particles, 10 to 10,000 rpm is preferred, with 100 to 5,000 rpm being more preferred. When the resin is employed as a thickener or an additive for polymers, 100 to 100,000 rpm is preferred, with 1,000 to 50,000 rpm being more preferred.

Disintegration can be performed in a single step or stepwise in several steps. No particular limitation is imposed on the particle size (average particle diameter) of the polysuccinimide gel, said particle size being achieved by the disintegration, or the particle size (average particle diameter) of the polysuccinimide in the dispersed state upon conducting the cross-linking reaction. It is preferable for the cross-linked polysuccinimide to have a smaller particle size because the reaction can be performed in a more uniformly dispersed state. The particle size may generally range from 0.00001 to 1 mm, with 0.0001 to 0.1 mm being more preferred. In general, the reaction velocity is reduced when the particle size of the dispersed product is too large. On the other hand, the particle size of the cross-linked polysuccinimide varies depending on the application purpose of the resulting cross-linked polyaspartic acid resin or the like. When the cross-linked polysuccinimide is used by adding it to another resin or the like, it is preferable to make the particle size of the cross-linked polysuccinimide resin smaller because the particle size of primary particles of the resulting cross-linked polyaspartic acid resin becomes smaller. The particle size may generally range from 0.00001 to 1 mm, with 0.0001 to 0.1 mm being more preferred. In general, the reaction velocity is reduced when the particle size of the dispersed product is too large. When the cross-linked polyaspartic acid resin is employed in disposable diapers or for agricultural or horticultural purposes, it is preferable for the cross-linked polyaspartic acid resin to have a relatively large particle size so that the cross-linked polysuccinimide during the disintegration may preferably have a greater particle size. Its particle size varies depending on the reaction conditions in the cross-linking reaction and cannot be specified in a wholesale manner. Nonetheless, a range of from 0.01 to 20 mm is preferred, with 0.1 to 2 mm being more preferred.

When such disintegration is applied to a cross-linked polysuccinimide gel obtained by cross-linking polysuccinimide in a non-dispersed state, a disintegrated gel is next subjected to a hydrolysis reaction of imide rings. This hydrolysis reaction step generally uses water as an essential component. When disintegration is conducted in water and/or a water-miscible organic solvent, the next hydrolysis step may be conducted as is without separating the disintegrated gel.

Further, it is also possible to have a salt for the hydrolysis reaction (an organic salt and/or inorganic salt) included beforehand in a material to be disintegrated and, subsequent to disintegration, to subject the resultant disintegrated mixture directly to the next hydrolysis step. Moreover, an aqueous alkaline solution for the hydrolysis reaction may be added at the same time as disintegration so that the disintegration and the hydrolysis reaction can be conducted concurrently.

When a slurry of a solid in an organic solvent is obtained by the disintegration and the solid is then separated from the organic solvent, the solid may be separated with a view to achieving recovery or the like of the organic solvent. As a preferred separation method, a general chemical separation method such as decantation or centrifugal separation can be mentioned. The thus-obtained solid may be subjected to the next hydrolysis step either after being dried or directly in the form of a wet cake. In other words, the organic solvent may be removed before the hydrolysis step or the hydrolysis step may be conducted directly without removing the organic solvent.

[8] Application purposes of cross-linked polysuccinimide

As has been described above, a cross-linked polysuccinimide can be produced at high productivity by the simple process that polysuccinimide, which has been brought into a dispersed state by a dispersant, is reacted with a cross-linking agent. As an alternative, it is also possible to produce a cross-linked polysuccinimide by the simple process that a gel of a cross-linked polysuccinimide is subjected to disintegration. In the cross-linking reaction of the former process, some imide rings of the polysuccinimide react with the cross-linking agent and are opened. Alkaline hydrolysis of imide rings remaining in the resulting cross-linked polysuccinimide makes it possible to obtain a good cross-linked polyaspartic acid resin. Namely, this cross-linked polysuccinimide is very useful as an intermediate for the production of a cross-linked polyaspartic acid resin.

It is however to be noted that the application purpose of the cross-linked polysuccinimide is not limited to this use as an intermediate. As a resin material, this cross-linked polysuccinimide itself is usable for various application purposes. It can also take use modes similar to those to be mentioned subsequently herein under "Use modes of cross-linked polyaspartic acid resin". Concerning its shape in use, it can also be formed into shapes similar to those to be mentioned subsequently herein under "Shape of cross-linked polyaspartic acid resin".

[9] Hydrolysis of imide rings of cross-linked polysuccinimide with an advance adjustment in swelling degree In the process of the present invention for the production of a cross-linked polyaspartic acid resin, the swelling degree of the resin in the reaction system is controlled within the range of from 3 to 100 times upon subjecting imide rings of the cross-linked polysuccinimide to a hydrolysis reaction. By this control, the hydrolysis is allowed to promptly proceed, thereby making it possible to provide the resultant cross-linked polyaspartic acid resin with improved water absorbency. The term "swelling degree" as used herein means the absorption level (amount) of water, organic solvents, salts, oligomers and the like in the resin from the reaction system when the resin is subjected to a hydrolysis reaction. At this moment, the resin is in the state of swelling by absorbing them. It is difficult to stir the resin in the state of swelling, but it is possible if an excess liquid is present. Such hydrolysis reaction is allowed to proceed in the presence of excess water. Therefore, the stirring can be smoothly conducted while maintaining the swelling degree of the resin within the specific range of the present invention. The amount of the excess liquid depends on the efficiency of a stirring machine. When the stirring machine can be driven at a high rotation speed with a high torque, the excess liquid may be in a small amount but, when it cannot be driven so, the excess liquid must be in a large amount.

In addition, it is also possible to prevent the gel-like resin from absorbing more water into a solid form as a result of a further progress of the hydrolysis. Further, it is also possible to avoid such a potential problem that stirring becomes difficult due to solidification of the gel-like resin and coagulation of a precipitate. This makes it possible to increase the concentration of the resin in the reaction mixture and, hence, to increase the volumetric efficiency.

It is preferred to control the swelling degree within a range of from 3 to 100 times, with a range of from 5 to 20 times being more preferred.

In the present invention, it is not necessary to conduct the hydrolysis reaction of imide rings within this range throughout the reaction. At certain stages, the swelling degree may temporarily fall outside this range. Such temporary departures are acceptable. For example, the swelling degree of the resin at an initial stage of the reaction, where the hydrolysis has not proceeded sufficiently, may substantially be zero (0) and, therefore, may departs from the above range. When a resin is produced without any particular advance indication of a particular target swelling degree, its swelling degree may significantly depart from the above range. The production process of the present invention can easily correct the swelling degree of a resin even when it departs significantly from the above range. The present invention can promptly perform the hydrolysis reaction of the imide rings of the cross-linked polysuccinimide and is also excellent in workability. In view of these, this process is also embraced in the present invention even when it is employed as a general process in steps other than such a hydrolysis reaction.

Specific examples of a method for controlling the swelling degree within the range of from 3 to 100 times can include the following four methods.

[9-1] To conduct the hydrolysis reaction in a solution which contains a water-miscible organic solvent.

[9-2] To conduct the hydrolysis reaction in an aqueous solution which contains an inorganic salt and/or an organic salt.

[9-3] To conduct the hydrolysis reaction in a solvent of from 40° C. to 100° C.

[9-4] To conduct the hydrolysis reaction by combining at least two of these methods [9-1] to [9-3] as needed.

A description will hereinafter be made about the methods [9-1] to [9-4].

[9-1] Method for conducting the hydrolysis reaction in an aqueous solution which contains a water-miscible organic solvent In this method, the swelling of a gel-like resin in a reaction system is controlled by suitably determining the ratio of the water to the water-miscible organic solvent in the aqueous solution and other conditions (the kind of the organic solvent, etc.).

No particular limitation is imposed on the water-miscible organic solvent insofar as it is an organic solvent miscible with water. Specific examples can include alcohols such as methanol, ethanol, propanol, isopropanol, butanol, 2-methoxyethanol and 2-ethoxyethanol, glycols such as ethylene glycol, diethylene glycol, triethylene glycol, propylene glycol and dipropylene glycol, ketones such as acetone, methyl ethyl ketone and methyl isobutyl ketone, cyclic ethers such as tetrahydrofuran and dioxane, N,N-dimethylformamide, N,N-dimethylacetamide, N-methylpyrrolidone, N,N'-dimethylimidazolidinone, dimethylsulfoxide, and sulfolane. Among these, methanol, ethanol, propanol, isopropanol and butanol are preferred especially in that the resulting resin can be easily dried and the solvent scarcely remains in the resin after the drying.

Amounts of the water-miscible organic solvent and water and their ratio are particularly important in the hydrolysis. Their suitable values vary depending on the polarity of the water-miscible organic solvent and are thus determined by the polarity of the mixed solvent of the water and the water-miscible organic solvent. When their ratio is set at 100% water, for example, the cross-linked polyaspartic acid resin is provided with a maximum water absorption. The water absorption becomes smaller as the proportion of the organic solvent becomes higher. When the proportion of the organic solvent is increased beyond a level, the resulting resin shows substantially no water absorbency.

According to a finding of the present inventors, a hydrolysis reaction in water upon production of a cross-linked polyaspartic acid resin by the hydrolysis of imide rings of a cross-linked polysuccinimide results in swelling and substantial gelation of the resin in the reaction system as a result of absorption of water, whereby it becomes difficult to conduct stirring of the reaction system. A hydrolyzing agent is therefore not allowed to spread so that the reaction does not proceed sufficiently. This results in a problem that the resulting cross-linked polyaspartic acid resin is not provided with high water absorbency. Further, a hydrolysis reaction in an organic solvent or a mixed solvent of water and an organic solvent, said mixed solvent containing the organic solvent in a large proportion, tends to allow the resin in the reaction system to undergo the hydrolysis reaction only at particle surfaces, leading to a substantial reduction in the reaction velocity of the hydrolysis. This also results in the problem that the resulting cross-linked polyaspartic acid resin is not provided with high water absorbency.

When a mixed solvent of water and a water-miscible organic solvent is used, the swelling degree of the resulting cross-linked polyaspartic acid resin is determined by their ratio as described above. In the process of the present invention, the swelling degree of a resin in a reaction system during the hydrolysis reaction is therefore controlled within the range of from 3 to 100 times by adjusting their ratio as needed. Transference of a liquid such as water or an organic solvent takes a longer time in a resin under swelling than in solution. A relaxation time is necessary for the equilibrium of the resin through absorption or release of the liquid. After controlling the ratio of water to an organic solvent to provide the resin with a desired swelling degree, it therefore takes some time until the desired swelling degree is achieved.

Further, the ratio of water to a water-miscible organic solvent in a reaction system can be changed as needed by adding a fresh supply of water or the water-miscible organic solvent to a reaction mixture as needed in the course of a progress of a hydrolysis reaction of imide rings of a cross-linked polysuccinimide in the mixed solvent of the water and the water-miscible organic solvent after the initiation of the reaction.

For example, when the water absorption of a cross-linked polyaspartic acid resin to be produced is not limited to a particular value, a hydrolysis reaction of imide rings may be initiated in water or a mixed solvent of water and a water-miscible organic solvent, said mixed solvent containing the water-miscible organic solvent at a high ratio relative to the water. When thickening of the resin has proceeded as a result of gelation, the water-miscible organic solvent may be added to the reaction mixture as much as needed, thereby making it possible to prevent the thickening.

It is also possible, for example, to initiate a hydrolysis reaction of imide rings in a water-miscible organic solvent or in a mixed solvent of water and a water-miscible organic solvent, said mixed solvent containing the water-miscible organic solvent at a high ratio relative to the water and then to add water to the reaction mixture as much as needed to prevent coagulation of a precipitate. Namely, the process of the present invention is very effective not only where the water absorption of a resin to be produced is specified in advance but also where the water absorption of a resin to be produced is not specified beforehand.

In a mixed solvent of water and a water-miscible organic solvent, the proportion of the water may preferably 5 wt. % or higher, with a range of from 20 to 80 wt. % being especially preferred.

Further, the separated cross-linked polysuccinimide may be subjected to the next hydrolysis step either in the form of wet cake with the solvent still contained therein or in a form rendered free of the solvent by drying.

[9-2] Method for conducting the hydrolysis reaction in an aqueous solution which contains an inorganic salt and/or an organic salt In this method, a hydrolysis reaction is conducted in the presence of an inorganic salt and/or an organic salt. The concentration and kind of the inorganic salt and/or the organic salt are suitably determined to adjust the osmosis pressure in a reaction system, whereby the swelling degree of a gel-like resin is controlled.

No particular limitation is imposed on the inorganic salt and the organic salt, and a wide variety of ordinary salts such as neutral salts, basic salts and acidic salts can be used. When a multivalent metal salt is used, it is preferable to use the salt at an appropriately reduced concentration, because the multivalent metal salt induces ionic cross-linking of carboxyl groups formed by hydrolysis of imide rings and the resulting cross-linked polyaspartic acid resin is thus provided with a higher cross-linking degree.

A solution which was prepared by adding the inorganic salt or the organic salt may be used, or alternatively a salt which was produced by neutralization in water may be used. Further, if a salt was produced in the previous cross-linking reaction, the salt may be used as is.

Illustrative usable salts can include metal salts, organic base salts, oxides and the like of inorganic mineral acids such as hydrochloric acid, hydrobromic acid, hydroiodic acid, hydrofluoric acid, sulfuric acid, sulfurous acid, disulfurous acid, amidosulfuric acid, thiosulfuric acid, nitric acid, nitrous acid, phosphoric acid, phosphorous acid, orthophosphoric acid, metaphosphoric acid, hypophosphoric acid, pyrophosphoric acid, phosphinic acid, phosphonic acid, carbonic acid, percarbonic acid, boric acid, orthoboric acid, metaboric acid, chloric acid, perchloric acid, hypochlorous acid, bromic acid, perbromic acid, hypobromous acid, iodic acid, periodic acid, hypoiodous acid, silicic acid, orthosilicic acid, metasilicic acid, aluminic acid, telluric acid, isocyanic acid, thiocyanic acid, manganic acid, permanganic acid, periodic acid, chromic acid, dichromic acid, meta-antimonous acid, metavanadic acid, and molybdic acid; and of organic acids such as organic phosphonic acids, organic sulfonic acids, organic carboxylic acid, oxalic acid, and organic phenols.

Among these, metal salts and organic base salts of hydrochloric acid, hydrobromic acid, hydroiodic acid, hydrofluoric acid, sulfuric acid, sulfurous acid, nitric acid, nitrous acid, phosphoric acid, orthophosphoric acid, metaphosphoric acid, pyrophosphoric acid, phosphinic acid, phosphonic acid, carbonic acid, boric acid, orthoboric acid, metaboric acid silicic acid, orthosilicic acid, metasilicic acid, oxalic acid, organic phosphoric acids, organic sulfonic acids and organic carboxylic acids are preferred, as they have low toxicity, have no oxidative or reductive property and are of low cost. Particularly preferred are metal salts and organic base salts of various acids such as hydrochloric acid, sulfuric acid, nitric acid, phosphoric acid, carbonic acid, boric acid, organic phosphonic acid, organic sulfonic acid and organic carboxylic acids.

Examples of the metals making up the metal salts can include lithium, sodium, potassium, beryllium, magnesium, aluminum, calcium, scandium, titanium, vanadium, chromium, manganese, iron, cobalt, nickel, copper, zinc, gallium, germanium, rubidium, strontium, yttrium, zirconium, niobium, molybdenum, ruthenium, rhodium, palladium, silver, cadmium, indium, tin, tellurium, cesium, barium, serium, gold, mercury, thallium, and lead. Among these, lithium, sodium and potassium are preferred because they have low toxicity, are of low cost and have high solubility in water.

Further, illustrative organic salts can include ammonium salts such as ammonium, tetramethylammonium, tetraethylammonium, tetrapropylammonium, tetrabutylammonium, tetrapentylammonium, tetrahexylammonium, ethyltrimethylammonium, trimethylproylammonium, butyltrimethylammonium, pentyltrimethylammonium, hexyltrimethylammonium, cyclohexyltrimethylammonium, benzyltrimethylammonium, triethylpropylammonium, triethylbutylammonium, triethylpentylammonium, triethylhexylammonium, cyclohexyltriethylammonium, and benzyltriethylammonium; and amine salts such as trimethylamine, triethylamine, tripropylamine, tributylamine, tripentylamine, trihexylamine, triethanolamine, tripropanolamine, tributanolamine, tripentanolamine, trihexanolamine, dimethylamine, diethylamine, dipropylamine, dibutylamine, dipentylamine, dihexylamine, dicyclohexylamine, dibenzylamine, ethylmethylamine, methylpropylamine, butylmethylamine, metylpentylamine, methylhexylamine, methylamine, ethylamine, propylamine, butylamine, pentylamine, hexylamine, octylamine, decylamine, dodecylamine, and hexadecylamine.

Among these, particularly preferred in view of solubility in water, odor, safety and cost are ammonium salts such as tetramethylammonium, tetraethylammonium, tetrapropylammonium, tetrabutylammonium, ethyltrimethylammonium, benzyltrimethylammonium and benzyltriethylammonium; and amine salts such as trimethylamine, triethylamine, tripropylamine, tributylamine, and triethanolamine.

Other specific examples can include chlorides such as sodium chloride, potassium chloride, lithium chloride, ammonium chloride, calcium chloride, magnesium chloride, beryllium chloride, aluminum chloride, titanium tetrachloride, vanadium chloride, chromium chloride, manganese chloride, iron chloride, cobalt chloride, nickel chloride, copper chloride, zinc chloride, strontium chloride, yttrium chloride, zirconium chloride, molybdenum chloride, ruthenium chloride, rhodium chloride, palladium chloride, silver chloride, cadmium chloride, tin chloride, tellurium chloride, cesium chloride, barium chloride, serium chloride, lead chloride, tetramethylammonium chloride, tetraethylammonium chloride, tetrabutylammonium chloride and triethanolamine hydrochloride, sodium bromide, potassium bromide, lithium bromide, ammonium bromide, tetramethylammonium bromide, tetraethylammonium bromide, tetrabutylammonium bromide, triethanolamine hydrobromide, sodium iodide, potassium iodide, lithium iodide, ammonium iodide, tetramethylammonium iodide, tetraethylammonium iodide, tetrabutylammonium iodide, triethanolamine hydroiodide, sodium sulfate, potassium sulfate, lithium sulfate, ammonium sulfate, tetramethylammonium sulfate, tetraethylammonium sulfate, tetrabutylammonium sulfate, triethanolamine sulfate, sodium nitrate, potassium nitrate, lithium nitrate, ammonium nitrate, tetramethylammonium nitrate, tetraethylammonium nitrate, tetrabutrlammonium nitrate, triethanolamine nitrate, sodium phosphate, potassium phosphate, lithium phosphate, ammonium phosphate, sodium carbonate, potassium carbonate, lithium carbonate, ammonium carbonate, tetramethylammonium carbonate, tetraethylammonium carbonate, tetrabutylammonium carbonate, triethanolamine carbonate, sodium borate, potassium borate, lithium borate, ammonium borate, sodium benzenesulfonate, potassium benzenesulfonate, lithium benzensulfonate, ammonium benzenesulfonate, tetramethylammonium benzenesulfonate, tetraethylammonium benzenesulfonate, tetrabutylammonium benzenesulfonate, triethanolamine benzenesulfonate, sodium p-toluenesulfonate, potassium p-toluenesulfonate, lithium p-toluenesulfonate, ammonium p-toluenesulfonate, tetramethylammonium p-toluenesulfonate, tetraethylammonium p-toluenesulfonate, tetrabutylammonium p-toluenesulfonate, triethanolamine p-toluenesulfonate, sodium benzoate, potassium benzoate, lithium benzoate, ammonium benzoate, tetramethylammonium benzoate, tetraethylammonium benzoate, tetrabutylammonium benzoate, triethanolamine benzoate, sodium oxalate, potassium oxalate, lithium oxalate, ammonium oxalate, tetramethylammonium oxalate, tetraethylammonium oxalate, tetrabutylammonium oxalate, triethanolamine oxalate, sodium acetate, potassium acetate, lithium acetate, ammonium acetate, tetramethylammonium acetate, tetraethylammonium acetate, tetrabutylammonium acetate, triethanol amine acetate, sodium propionate, potassium propionate, lithium propionate, ammonium propionate, tetramethylammonium propionate, tetraethylammonium propionate, tetrabutylammonium propionate, and triethanolamine propionate.

Among these, preferred are sodium chloride, potassium chloride, lithium chloride, ammonium chloride, tetramethylammonium chloride, tetraethylammonium chloride, tetrabutylammonium chloride, triethanolamine hydrochloride, sodium bromide, potassium bromide, lithium bromide, ammonium bromide, tetramethylammonium bromide, tetraethylammonium bromide, tetrabutylammonium bromide, triethanolamine hydrobromide, sodium iodide, potassium iodide, ammonium iodide, tetramethylammonium iodide, tetraethylammonium iodide, tetrabutylammonium iodide, triethanolamine hydroiodide, sodium sulfate, potassium sulfate, ammonium sulfate, tetramethylammonium sulfate, tetraethylammonium sulfate, tetrabutylammonium sulfate, triethanolamine sulfate, sodium nitrate, potassium nitrate, ammonium nitrate, tetramethylammonium nitrate, tetraethylammonium nitrate, tetrabutylammonium nitrate, triethanolamine nitrate, sodium phosphate, potassium phosphate, ammonium phosphate, sodium carbonate, potassium carbonate, lithium carbonate, ammonium carbonate, tetramethylammonium carbonate, tetraethylammonium carbonate, tetrabutylammonium carbonate, triethanolamine carbonate, sodium borate, potassium borate, ammonium borate, sodium benzenesulfonate, potassium benzensulfonate, ammonium benzenesulfonate, tetramethylammonium benzenesulfonate, tetraethylammonium benzenesulfonate, tetrabutylammonium benzenesulfonate, triethanolamine benzenesulfonate, sodium p-toluenesulfonate, potassium p-toluenesulfonate, ammonium p-toluenesulfonate, tetramethylammonium p-toluenesulfonate, tetraethylammonium p-toluenesulfonate, tetrabutylammonium p-toluenesulfonate, triethanolamine p-toluenesulfonate, sodium benzoate, potassium benzoate, ammonium benzoate, tetramethylammonium benzoate, tetraethylammonium benzoate, tetrabutylammonium benzoate, triethanolamine benzoate, sodium oxalate, potassium cxalate, ammonium oxalate, sodium acetate, potassium acetate, ammonium acetate, tetramethylammonium acetate, tetraethylammonium acetate, tetrabutylammonium acetate, triethanolamine acetate, sodium propionate, and potassium propionate. Especially preferred are sodium chloride, potassium chloride, ammonium chloride, tetramethylammonium chloride, tetraethylammonium chloride, tetrabutylammonium chloride, triethanolamine hydrochloride, sodium sulfate, potassium sulfate, ammonium sulfate, tetramethylammonium sulfate, tetraethylammonium sulfate, tetrabutylammonium sulfate, triethanolamine sulfate, sodium phosphate, potassium phosphate, ammonium phosphate, sodium carbonate, potassium carbonate, ammonium carbonate, sodium borate, potassium borate, ammonium borate, sodium benzenesulfonate, potassium benzensulfonate, ammonium benzenesulfonate, tetramethylammonium benzenesulfonate, tetraethylammonium benzenesulfonate, tetrabutylammonium benzenesulfonate, triethanolamine benzenesulfonate, sodium p-toluenesulfonate, potassium p-toluenesulfonate, ammonium p-toluenesulfonate, tetramethylammonium p-toluenesulfonate, tetraethylammonium p-toluenesulfonate, tetrabutylammonium p-toluenesulfonate, triethanolamine p-toluenesulfonate, sodium benzoate, potassium benzoate, ammonium benzoate, sodium oxalate, potassium oxalate, ammonium oxalate, sodium acetate, potassium acetate, ammonium acetate, sodium propionate, and potassium propionate.

The above-exemplified individual salts may be used either singly or in combination. In some instances, they can also be used in combination with inorganic salts and organic salts.

In this process, the salt may be added in an initial stage of the reaction or may be added as needed during the reaction. The addition of the salt makes it possible to control the swelling degree of the resulting gel.

The concentration of the salt in the reaction mixture may preferably be from 0.01 to 20 wt. %, with 0.1 to 5 wt. % being more preferred. Setting of the concentration of the salt at an appropriately high level makes it possible to exhibit the effect of the salt, whereas setting of its concentration at an adequately low level makes it possible to prevent mixing of the salt into the resin.

In this process, an organic solvent may be mixed with an aqueous solution of an inorganic salt and/or an organic salt. Organic solvents include both water-miscible organic solvents and water-immiscible organic solvents, and they are both usable.

Specific examples of the water-miscible organic solvents can be those similar to the water-miscible organic solvents exemplified above in the description of the method [9-1]. On the other hand, specific examples of the water-immiscible organic solvents can include petroleum ether, pentane, hexane, heptane, octane, cyclohexane, benzene, toluene, ethylbenzene, xylene, decalin, and diphenyl ether. Especially, methanol, ethanol, propanol, isopropanol and butanol, which are water-miscible organic solvents, are preferred in that the cross-linked polyaspartic acid resin available by the hydrolysis reaction can be easily dried and the solvents scarcely remain in the resin after the drying.

When a mixed solvent of water and an organic solvent is used, the proportion of the water in the mixed solvent may preferably be 5 wt. % or higher, with a range of from 20 to 80 wt. % being particularly preferred.

[9-3] Method for conducting the hydrolysis reaction in a solvent of from 40° C. to 100° C.

In this method, the temperature of the reaction mixture is suitably adjusted by making use of the characteristic that the water absorbency of a cross-linked polyaspartic acid resin is reduced at high temperatures, whereby the swelling degree of the gel-like resin in the reaction system is controlled.

The solvent employed in this method may be water or an aqueous solution containing an organic solvent mixed therein. Organic solvents include both water-miscible organic solvents and water-immiscible organic solvents, and they are both usable. As specific examples of the water-miscible organic solvents and water-immiscible organic solvents, those similar to the organic solvents mentioned above in the descriptions of the methods [9-1] and [9-2] can be mentioned.

When a mixed solvent of water and an organic solvent is used, the proportion of the water in the mixed solvent may also preferably be 5 wt. % or higher, with a range of from 20 to 80 wt. % being particularly preferred.

[9-4] Method for conducting the hydrolysis reaction by combining at least two of these methods [9-1] to [9-3] as needed No particular limitation is imposed on the manner of the combination. A suitable combination may be chosen in view of the kind of the desired resin, the production apparatus, the reaction conditions and the like. In general, the temperature of the reaction system may preferably be from 5° C. to 100° C., more preferably from 10° C. to 60° C. when the swelling degree is not controlled, namely, when the method [9-3] is not adopted. By combining these methods, the swelling degree of the resin an be easily controlled so that the hydrolysis reaction is effectively conducted to obtain an excellent resin.

[9-5] Amount of water for use in the hydrolysis reaction.

It is necessary to conduct the c:ross-linking reaction of imide rings of a cross-linked polysuccinimide in the presence of water. The amount of this water can be determined as desired. In each of the above-described methods [9-1] to [9-4], the preferred amount of water may generally be 1 to 50 times by weight as much as the resulting cross-linked polyaspartic acid resin, with 1 to 20 times by weight being particularly preferred. In the method [9-1], the amount of water should be determined by also taking into consideration the ratio of water to a water-miscible organic solvent.

[9-6] Alkaline reagent for use in the hydrolysis reaction

No particular limitation is imposed on an alkaline reagent which is employed to subject imide rings of a cross-linked polysuccinimide to a hydrolysis reaction, but an aqueous alkaline solution is generally used.

Examples of the aqueous alkaline solution can include various aqueous solutions making use of alkali metal salts, for example, alkali metal hydroxides such as sodium hydroxide, potassium hydroxide and lithium hydroxide, alkali metal carbonates such as sodium carbonate, potassium carbonate and lithium carbonate, alkali metal hydrogencarbonates such as sodium hydrogencarbonate and potassium hydrogencarbonate, alkali metal acetates such as sodium acetate and potassium acetate, and sodium oxalate; and aqueous ammonia. Among these, aqueous solutions of sodium hydroxide and potassium hydroxide are preferred for their economical costs. They can be used either singly or in combination.

[9-7] pH of the hydrolysis reaction system

The pH of a reaction mixture upon conducting a hydrolysis reaction varies depending on the concentration of a reagent such as an aqueous alkaline solution. When this pH is adequately lowered, it is possible to prevent cutting of molecules of the resin and, as a result, to avoid a reduction in water absorbency. If the pH is appropriately raised, the reaction velocity can be accelerated so that a practical step can be established. In general, this pH may preferably from 7.5 to 13, more preferably from 9 to 12.

[10] Hydrolysis of imide rings of a cross-linked polysuccinimide without any adjustment of swelling degree.

In the foregoing, the description was made about the methods in each of which the swelling degree of a resin in a reaction system was controlled within the range of from 3 to 100 times upon subjecting imide rings of a cross-linked polysuccinimide to a hydrolysis reaction. These methods can bring about excellent effects in connection with the water absorbency of the resulting cross-linked polyaspartic acid resin and the volumetric efficiency.

It is however to be noted that the present invention is not limited only to the process featuring control of the swelling degree of a resin in a hydrolysis reaction but also include the above-described process featuring cross-linking of polysuccinimide in a dispersed state and the below-described process featuring washing of a gel of a cross-linked polyaspartic acid resin, said gel having been obtained by hydrolysis, as is with water and/or a water-miscible organic solvent.

These processes become more useful from the practical viewpoint when they are conducted in combination with the process featuring the adjustment of the swelling degree of a resin in the hydrolysis reaction. It is however to be noted that, even if the hydrolysis reaction is conducted without any control of the swelling degree, these processes can bring about their own effects.

When the hydrolysis reaction of imide rings of a cross-linked polysuccinimide is conducted without controlling the swelling degree, no particular limitation is imposed on each specific condition insofar as the process can substantially open the imide rings by alkaline hydrolysis and can form carboxyl groups (or salts thereof) by the ring opening. It is however preferred to adopt conditions similar to the above-described preferable conditions for conducting a hydrolysis reaction while controlling the swelling degree. When the swelling degree is not controlled, the preferred temperature of the reaction system may generally be from 5° C. to 100° C., with 10° C. to 60° C. being more preferred.

[11] Post-treatment of a cross-linked polyaspartic acid resin

No particular limitation is imposed on post-treatment of a cross-linked polyaspartic acid resin available as a result of an alkaline hydrolysis reaction of imide rings of a cross-linked polysuccinimide. For example, treatments or processings such as neutralization, salt interchange, drying, purification, granulation and surface cross-linking can be conducted as needed. A description will hereinafter be made especially about neutralization, salt interchange and drying.

[11-1] Neutralization treatment of a cross-linked polyaspartic acid resin

Neutralization treatment of a cross-linked polyaspartic acid resin can be conducted as needed. It is however to be noted that the reaction mixture after the hydrolysis reaction, which contains the cross-linked polyaspartic acid resin, is usually alkaline. It is therefore preferred to neutralize it by adding an acid or the like. By this neutralization treatment, carboxyl groups contained in the molecules of the cross-linked polyaspartic acid resin can be converted into salts. Although no particular limitation is imposed on this neutralization degree, the proportion of carboxyl groups in the form of the salts may preferably account for 0 to 50%, with 0 to 30% being more preferred, both based on the total number of aspartic acid residual groups in the molecules of the cross-linked polyaspartic acid resin.

No particular limitation is imposed in the method of the neutralization treatment, but it is commonly practiced to adjust the pH by adding an acid after the hydrolysis reaction. Specific examples of the acid can include mineral acids such as hydrochloric acid, hydrobromic acid, hydroiodic acid, sulfuric acid, sulfurous acid, nitric acid, nitrous acid, carbonic acid and phosphoric acid; carboxylic acids such as formic acid, acetic acid, propionic acid, oxalic acid and benzoic acid; sulfonic acids such as methanesulfonic acid, trifluoromethanesulfonic acid, benzenesulfonic acid and toluenesulfonic acid; and phosphonic acid such as benzenephosphonic acid.

Among these, hydrochloric acid and sulfuric acid are preferred, with hydrochloric acid being particularly preferred, in view of the cost and the readiness in removal.

[11-2] Salt-interchange treatment of a cross-linked polyaspartic acid resin.

When carboxyl groups contained in molecules of a cross-linked polyaspartic acid resin are converted into salts by neutralization treatment, the salts may be converted into salts of a different kind as needed.

As examples of a reagent usable in this salt interchange, alkali metal salts, ammonium salts, amine salts and the like can be mentioned. Specific examples can include alkali metal salts such as sodium, potassium, and lithium salts; ammonium salts such as ammonium, tetramethylammonium, tetraethylammonium, tetrapropylammonium, tetrabutylammonium, tetrapentylammonium, tetrahexylammonium, ethyltrimethylammonium, trimethylpropylammonium, butyltrimethylammonium, pentyltrimethylammonium, hexyltrimethylammonium, cyclohexyltrimethylammonium, benzyltrimethylammonium, triethylpropylammonium, triethylbutylammonium, triethylpentylammonium, triethylhexylammonium, cyclohexyltriethylammonium, and benzyltriethylammonium salts; and amine salts such as trimethylamine, triethylamine, tripropylamine, tributylamine, tripentylamine, trihexylamine, triethanolamine, tripropanolamine, tributanolamine, tripentanolamine, trihexanolamine, dimethylamine, diethylamine, dipropylamine, dibutylamine, dipentylamine, dihexylamine, dicyclohexylamine, dibenzylamine, ethylmethylamine, methylpropylamine, butylmethylamine, metylpentylamine, methylhexylamine, methylamine, ethylamine, propylamine, butylamine, pentylamine, hexylamine, octylamine, decylamine, dodecylamine, and hexadecylamine salts.

Among these salts, those having smaller molecular weights are preferred because a greater molecular weight leads to a relatively greater molecular weight per monomer unit and hence to a smaller water absorption per unit weight. Further, those having lower toxicity are preferred when the resulting cross-linked polyaspartic acid resin has possibility of being brought into contact with human skin or the like. For these reasons, it is preferred to use a sodium, potassium, lithium, ammonium or triethanolamine salt. Use of sodium or potassium salt is particularly preferred from the standpoint of cost.

[11-3] Drying of a cross-linked polyaspartic acid resin

No particular limitation is imposed on a drying method for a cross-linked polyaspartic acid resin. For example, a conventional method can be mentioned, such as drying in hot air, drying with specific vapor, microwave drying, vacuum drying, drying in a drum drier, or drying by azeotropic dehydration in a hydrophobic organic solvent. In general, the drying temperature may preferably from 20 to 200° C., with 50 to 120° C. being more preferred.

To the cross-linked polyaspartic acid resin already subjected to such drying, purification, granulation, surface cross-linking and the like can be applied further.

[12] Washing of a cross-linked polyaspartic acid resin

In the process of this invention for the production of a cross-linked polyaspartic acid resin, a gel of the cross-linked polyaspartic acid resin is washed or reprecipitated with water and/or a water-miscible organic solvent.

By this purification method, the cross-linked polyaspartic acid resin is improved in water absorbency and gel strength. This is believed to be attributable to the elimination of water-soluble components—such as monomers, oligomers, and an inorganic or organic salt—which are contained in the gel of the resin and reduce properties of the resin.

As specific examples of the washing, the following two methods can be mentioned.

[12-1] To wash a cross-linked polyaspartic acid resin by filtering its gel, which has been caused to swell by water or a mixed solvent of water and a water-miscible organic solvent, as is by using water and/or a water-miscible organic solvent

[12-2] To wash a cross-linked polyaspartic acid resin by reprecipitating its gel, which has been caused to swell by water or a mixed solvent of water and a water-miscible organic solvent, by using a water-miscible organic solvent.

These methods [12-1] and [12-2] can be applied to a cross-linked polyaspartic acid resin in an isolated form and also to a cross-linked polyaspartic acid resin in an unisolated state, namely, in the form of a wet cake, a pressed cake, a slurry or the like.

A description will hereinafter be made about these methods [12-1] and [12-2].

[12-1] Method for filtering and washing a gel by using water and/or a water-miscible organic solvent According to this method, a gel of a cross-linked polyaspartic acid resin—which has been caused to swell, for example, by water or a mixed solvent of water and a water-miscible organic solvent—is filtered as is by using water and/or the water-miscible organic solvent, and a hydrogel obtained by the filtration is then washed with water and/or the water-miscible organic solvent. By the filtration, impurities smaller than the openings of a filter medium can be filtered off and, if desired, the remaining impurities can be removed by additional washing.

No particular limitation is imposed on the water-miscible organic solvent to be used, insofar as it is an organic solvent having miscibility with water. Specific examples can include alcohols such as methanol, ethanol, propanol, isopropanol, butanol, 2-methoxyethanol and 2-ethoxyethanol, glycols such as ethylene glycol, diethylene glycol, triethylene glycol, propylene glycol and dipropylene glycol, ketones such as acetone, methyl ethyl ketone and methyl isobutyl ketone, cyclic ethers such as tetrahydrofuran and dioxane, N,N-dimethylformamide, N,N-dimethylacetamide, N-methylpyrrolidone, N,N'-dimethylimiiazolidinone, dimethylsulfoxide, and sulfolane. Among these, methanol, ethanol, propanol, isopropanol and butanol are preferred especially in that the resulting cross-linked polyaspartic acid resin can be easily dried and the solvent scarcely remains in the resin after the drying.

The amounts of the water and the water-miscible organic solvent, which are used for causing the swelling of the resin, are not limited specifically, insofar as they can achieve sufficient swelling of the resin. The swelling degree of the resin varies depending on the water absorbency of the resin. In this method, it is particularly preferred to achieve the swelling by using distilled water or deionized water in an excess amount. However, it is not economical to use water in an unduly large amount. In view of these, the preferred amount of distilled water or deionized water to be used may be from 0.001 to 10 times by weight as much the amount of distilled water or deionized water absorbable in the resin, with 0.02 to 5 times by weight being more preferred.

No particular limitation is imposed on the amount of the water and/or the water-miscible organic solvent employed for washing the gel of the swollen resin. Nonetheless, from the standpoint of washing effects and economy, the preferred amount may be from 1 to 50 times by weight as much the weight of the resin, with 3 to 20 times by weight being particularly preferred. When a mixed solvent of water and a water-miscible organic solvent is used for washing the gel of the swollen resin, on the other hand, no particular limitation is imposed on their ratio but, from the standpoint of washing effects, the proportion of the water may preferably be 20 wt. % or higher. Here, a higher proportion of the organic solvent results in shrinkage of the gel so that, as in the method [12-2], the resin is brought into a reprecipitated state.

Although no particular limitation is imposed on the medium to be used for the filtration, a steel sieve, a non-woven nylon fabric, a glass filter or the like can be mentioned by way of example. The mesh size of the filter may preferably be from 50 $\mu$m to 2 mm in terms of openings, with 100 $\mu$m to 1 mm being more preferred. The speed of filtration becomes faster when the mesh size is adequately increased, whereas the recovery rate of gel becomes higher when the mesh size is appropriately decreased.

The filtration may be conducted while maintaining the filtered mixture standstill or under stirring. As a further alternative, the filtration may be conducted while vibrating or rotating the filtered mixture together with the filter. Further, the filtration may be conducted under atmospheric pressure or elevated pressure or may be performed as suction filtration under reduced pressure.

As the washing method of the gel, the gel may be washed in a usual manner, or the gel may be filtered and washed by filtering the gel to obtain a hydrogel, dispersing the hydrogel in distilled water or deionized water and then allowing the hydrogel to precipitate there. Although the method involving the dispersion and the subsequent precipitation requires a greater number of procedures, it can achieve higher washing efficiency.

Further, the gel which fell through the openings upon filtration precipitated on the bottom, so that the gel so precipitated can be recovered and used.

The filtered and washed gel may be dried as is, or may be precipitated in a water-miscible organic solvent, followed by the collection and drying of the precipitate.

Although no particular limitation is imposed on the water-miscible organic solvent for use in the reprecipitation, general examples can include alcohols such as methanol, ethanol, propanol, isopropanol, butanol, 2-methoxyethanol and 2-ethoxyethanol, glycols such as ethylene glycol, diethylene glycol, triethylene glycol, propylene glycol and dipropylene glycol, ketones such as acetone, methyl ethyl ketone and methyl isobutyl ketone, cyclic ethers such as tetrahydrofuran and dioxane, N,N-dimethylformamide, N,N-dimethylacetamide, N-methylpyrrolidone, N,N'-dimethylimidazolidinone, dimethylsulfoxide, and sulfolane. Among these, methanol, ethanol, propanol, isopropanol and acetone are preferred for their availability at economical prices.

[12-2] Method for washing a gel by reprecipitation which makes use of a water-miscible organic solvent According to this method, a gel of a cross-linked polyaspartic acid resin, which has been caused to swell, for example, by water or a mixed solvent of water and a water-miscible organic solvent—is poured as is into a water-miscible organic solvent to reprecipitate the resin, or a water-miscible organic solvent is charged into the gel to reprecipitate the resin.

Swelling of the cross-linked polyaspartic acid resin may be conducted in a similar manner as in the above-described method [12-1].

When the precipitation is effected by pouring the gel into the water-miscible organic solvent, the viscosity of the gel may be adjusted before the pouring as needed. For example, the viscosity of the gel becomes higher when the proportion of water contained in the gel is increased, while the gel becomes lower in viscosity and is turned into a slurry when the proportion of the water-miscible organic solvent is increased conversely. However, no particular limitation is imposed on the manner or timing of the pouring. When the gel or a slurry of the gel is soaked in a water-miscible organic solvent, the resin may aggregate into a rigid mass in the course of the soaking. In such a case, it is preferred to stir it at a high speed during the soaking or to grind the mass in a grinding mill having stirring blades with cutting edges.

Illustrative of the water-miscible organic solvent employed for the reprecipitation can be acetone, methyl ethyl ketone, methanol, ethanol, propanol, butanol, heptanol, ethylene glycol, propylene glycol, 1,2-dimethoxyethane, methoxymethanol, 2-methoxyethanol, tetrahydrofuran, dioxane, N,N-dimethylaminoformamide, N,N-dimethylaminoacetamide, dimethylsulfoxide, N,N-dimethylimidazolidinone, sulfolane, and N-methylpyrrolidone. From the industrial viewpoint, acetone, methanol and ethanol are preferred for their high safety and easy recovery. They can be used either singly or in combination. The water-miscible organic solvent employed for the precipitation may be the same as the water-miscible organic solvent used for the swelling of the resin. It may contain water if necessary.

No particular limitation is imposed on the amount of the water-miscible organic solvent used for the reprecipitation, insofar as the gel can be reprecipitated (full reprecipitation or gel-reprecipitation). In general, its amount may be preferably from 0.5 to 10 times by weight, more preferably from 1 to 5 times by weight as much as the weight of the resin although it varies depending on the kind of the solvent.

[13] Production of a cross-linked polyaspartic acid resin without washing

The foregoing description was about the method in which a gel of a cross-linked polyaspartic acid resin, said gel having been obtained by hydrolysis, is washed as is with water and/or a water-miscible organic solvent. This method can bring about excellent effects for the water absorbency and gel strength of the cross-linked polyaspartic acid resin.

However, this invention becomes more useful from the practical viewpoint if it is not performed only as the process featuring the washing or reprecipitation of a gel of a cross-linked polyaspartic acid resin with water and/or a water-miscible organic solvent but is conducted as a combination of the above process and the process featuring the above-described crosslinking of polysuccinimide in a dispersed state. It is however to be noted that the latter process can bring about its own effects even when the gel of the cross-linked polyaspartic acid resin is not subjected to washing or reprecipitation. Namely, the above washing or reprecipitation can be conducted as needed depending on the application purpose of the resin or properties required therefor.

[14] Shape of a cross-linked polyaspartic acid resin

Specific examples of the shape of a cross-linked polyaspartic acid resin can include various shapes such as crushed pieces of irregular shapes, spheres, grains, granules, granulated particles, flakes, lumps, pearls, fine powder, fibers, rods, films and sheets. Depending on the application purpose, a preferred shape can be chosen. It can also be in the form of a fibrous base material, a porous body, an expanded body, a granulated material or the like.

[15] Particle size of a cross-linked polyaspartic acid resin

No particular limitation is imposed on the particle size (average particle diameter) of a cross-linked polyaspartic acid resin, and a preferred particle size can be chosen depending on the application purpose. In the case of disposable diapers, for example, an average size of from 100 to 1,000 $\mu$m is preferred, with a range of from 150 to 600 $\mu$m being more preferred, because a fast absorption speed and avoidance of gel blocking are desired. When employed in a form kneaded in a resin such as a waterstopping material or for like purposes, its average particle size may preferably be from 1 to 10 $\mu$m. When used as a water-holding material for agricultural and horticultural applications, a range of from 100 $\mu$m to 5 mm is preferred in view of its dispersibility in soil.

[16] Mode of use of a cross-linked polyaspartic acid resin

No particular limitation is imposed on the mode of use of a cross-linked polyaspartic acid resin. It can be used either singly or in combination with another material.

When using the cross-linked polyaspartic acid resin in combination with another resin, it can be kneaded in a thermoplastic resin, followed by molding by injection molding or the like; it can be mixed with constituent monomer(s) of the another resin and, if necessary, an initiator, followed by polymerization by light, heat or the like; it can be dispersed along with the another resin in a solvent, followed by casting and solvent removal; it can be mixed with a prepolymer of the another resin, followed by cross-linking; and it can be mixed with the another resin, followed by cross-linking.

No particular limitation is imposed on the molded or otherwise formed product of the cross-linked polyaspartic acid resin. It can be used in the form of solid matters, sheets, films, fibers, nonwoven fabrics, expanded bodies, rubber and the like. Further, no particular limitation is imposed on their molding or forming methods.

The cross-linked polyaspartic acid resin can be used by itself or in the form of a composite material combined with another material. Although no particular limitation is imposed on the structure of the composite material, it can be formed into a sandwich structure by holding it between pulp layers, nonwoven fabrics or the like; it can be formed into a multilayer structure by using a resin sheet or film as a base material; or it can be formed into a double-layer structure by casting it on a resin sheet. For example, formation of the cross-linked polyaspartic acid resin into the shape of a sheet provides a superabsorbent sheet (including a superabsorbent film).

Further, the cross-linked polyaspartic acid resin can also be blended with one or more other superabsorbent resins as needed. It is also possible to add, as needed, inorganic compounds such as salt, colloidal silica, white carbon, ultrafine silica and titanium oxide powder; and organic compounds such as chelating compounds. Moreover, it is also possible to mix oxidizing agents, antioxidants, reducing agents, ultraviolet absorbers, antibacterial agents, fungicides, mildewproofing agents, fertilizers, perfumes, deodorants, pigments and the like.

The cross-linked polyaspartic acid resin can also be used in the form of a gel or solid matter. It is used in a gel form, for example, when employed in water-holding materials for agricultural and horticultural applications, life prolonging agents for cut flowers, gel-type aromatics, gel-type deodorants and the like; and it is used in a solid form when employed as an absorbent for disposable diapers.

[17] Application purposes of a cross-linked polyaspartic acid resin

No particular limitation is imposed on the application purposes of a cross-linked polyaspartic acid resin. It can be used in any application fields where conventional superabsorbent resins are usable.

Illustrative applications can include sanitary products such as sanitary napkins, disposable diapers, breast milk pads, and disposable dustcloths; medical products such as wound-protecting dressing materials, medical underpads, and cataplasms; daily necessaries such as pet sheets, portable toilets, gel-type aromatics, gel-type deodorants, sweat-absorbing fibers, and disposable pocket heaters; toiletry products such as shampoos, hair-setting gels, and moisturizers; agricultural and horticultural products such as agricultural and horticultural water-holding materials, life-prolonging agents for cut flowers, floral forms (fixing bases for cut flowers), seedling nursery beds, solution culture vegetation sheets, seed tapes, fluidized seedling media, and dew-preventing agricultural sheets; food packaging materials such as freshness-retaining materials for food trays, and drip absorbent sheets; materials for use during transportation, such as cold insulators, and water absorbent sheets for use during the transportation of fresh vegetables; construction and civil engineering materials such as dew-preventing construction materials, sealing materials for civil engineering and construction, lost circulation preventives for the shield tunneling method, concrete admixtures, gaskets and packings; materials relating to electric and electronic equipments, such as sealing materials for electronic equipments and optical fibers, waterstopping materials for communication cables, and ink jet recording papers; water treatment materials, such as sludge solidifiers, and dehydrating agents for gasoline and oils; textile-printing sizing materials; water-swelling toys; artificial snow; sustained-release fertilizers; sustained-release agrichemicals; sustained-release drugs; humidity regulating materials; and antistatic agents.

The present invention will hereinafter be described more specifically by Examples. It should however be borne in mind that the present invention is not limited only to the Examples. In the following Examples and Comparative Examples, all designations of "part" or "parts" mean "part by weight" or "parts by weight".

The water absorption in each Example was measured by the below-described tea bag method, whereas the gel strength in each Example was measured by the below-described steel-ball placing method. Further, the volumetric efficiency of a reaction in the hydrolysis of imide rings of each cross-linked polysuccinimide was expressed in terms of percentage by weight (wt. %) of the resulting resin based on the total weight of the employed solvent and the cross-linked polysuccinimide.

(1) Tea Bag Method

The measurement of water absorption was conducted using distilled water and physiological saline as liquids to be absorbed. Specifically, about 0.05 part of a superabsorbent resin was placed in a tea bag made of nonwoven fabric (80 mm×50 mm) in the case of distilled water, whereas about 0.1 part of the superabsorbent resin was filled in a similar tea bag. Each tea bag was immersed in an excess amount of the corresponding liquid, in which the resin was allowed to swell for 1 hour. The tea bag was then pulled out. After the liquid was allowed to drip away for 1 minute, the weight of the tea bag with the swollen resin contained therein was measured. The above procedures were likewise repeated using, as a blank, a similar tea bag only. The weight of the blank and the weight of the superabsorbent resin were subtracted from the weight of the tea bag with the swollen resin contained therein. A value obtained by dividing the difference with the weight of the superabsorbent resin was recorded as a water absorption (g/one-gram resin). Incidentally, the physiological saline was a 0.9 wt. % aqueous solution of sodium chloride.

(2) Steel-ball Placing Method

Physiological saline (250 parts) was added to 5 parts of a superabsorbent resin, followed by gelation for 1 hour. On the gel, steel balls were placed one after one, one steel ball on the gel each time, starting from the steel ball having a smallest diameter. The greatest one of the diameters of balls which were allowed to remain for 30 seconds or longer on the gel without sinking was recorded as the gel strength of the gel.

(A) EXAMPLES DIRECTED TO THE USE OF A DISPERSANT IN A CROSS-LINKING REACTION

Example A1

In 40 parts of distilled water, 7.2 parts of lysine methyl ester dihydrochloride and 22.6 parts of lysine monohydrochloride were dispersed. To the resultant dispersion, 7.8 parts of caustic soda were added little by little for neutralization, whereby an aqueous solution of lysine was prepared. On the other hand, 100 parts of polysuccinimide having a weight average molecular weight of 96,000 were dissolved in 400 parts of N,N-dimethylformamide (hereinafter abbreviated as "DMF") under a nitrogen gas stream, followed by the addition of the aqueous solution of lysine. After the thus-prepared mixture was stirred at room temperature for 30 minutes, 400 parts of toluene as a dispersant (poor solvent) were charged to disperse the polysuccinimide, followed by a reaction for 2 hours. After the reaction, the reaction mixture was subjected to suction filtration to collect a precipitate. The precipitate was washed with toluene and then dried at 60° C. for 2 hours, whereby a cross-linked polysuccinimide was obtained.

The cross-linked polysuccinimide (120 parts) was dispersed in a mixture of 400 parts of distilled water and 400 parts of methanol, followed by the dropwise addition of 130 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 125 parts of a cross-linked polyaspartic acid resin as a superabsorbent polymer were obtained.

The water absorption of the cross-linked polyaspartic acid resin was 890 times in the case of distilled water and 71 times in the case of physiological saline.

Example A2

In 80 parts of distilled water, 37.6 parts of lysine monohydrochloride were dispersed. To the resultant dispersion, 10.3 parts of caustic soda were added for neutralization, whereby an aqueous solution of lysine was prepared. On the other hand, 100 parts of polysuccinimide having a weight average molecular weight of 96,000 were dissolved in 400 parts of DMF under a nitrogen gas stream, followed by the addition of the aqueous solution of lysine. After the thus-prepared mixture was stirred at room temperature for 10 minutes, 400 parts of methanol as a dispersant (poor solvent) were charged for dispersion, followed by a reaction for 20 hours. After the reaction, the reaction mixture was subjected to suction filtration to collect a precipitate. The precipitate was washed with methanol, whereby a wet cake of a cross-linked polysuccinimide was obtained.

The wet cake of the cross-linked polysuccinimide was dispersed in a mixture of 400 parts of distilled water and 400 parts of methanol, followed by the dropwise addition of 122.1 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 140 parts of a cross-linked polyaspartic acid resin as a superabsorbent polymer were obtained.

The water absorption of the cross-linked polyaspartic acid resin was 860 times in the case of distilled water and 70 times in the case of physiological saline.

Example A3

A wet cake of a cross-linked polysuccinimide was obtained in a similar manner as in Example A2 except that a solution of 3.0 parts of hexamethylenediamine as a cross-linking agent in 10 parts of distilled water was used instead of the aqueous solution of lysine.

The wet cake of the cross-linked polysuccinimide was subjected to hydrolysis, neutralization, collection and drying in a similar manner as in Example A2 except for the use of 148.8 pats of a 27 wt. % aqueous solution of caustic soda, whereby 108 parts of a cross-linked polyaspartic acid resin as a superabsorbent polymer were obtained.

The water absorption of the cross-linked polyaspartic acid resin was 880 times in the case of distilled water and 70 times in the case of physiological saline.

Example A4

In a similar manner as in Example A1 except that a dispersion of 3.5 parts of m-xylylenediamine as a cross-linking agent in 20 parts of toluene was used instead of the aqueous solution of lysine, a wet cake of a cross-linked polysuccinimide was obtained by conducting the steps before the drying.

The wet cake of the cross-linked polysuccinimide was subjected to hydrolysis, neutralization, collection and drying in a similar manner as in Example A2 except for the use of 148.8 pats of a 27 wt. % aqueous solution of caustic soda, whereby 110 parts of a cross-linked polyaspartic acid resin as a superabsorbent polymer were obtained.

The water absorption of the cross-linked polyaspartic acid resin was 760 times in the case of distilled water and 65 times in the case of physiological saline.

Example A5

In 150 parts of distilled water, 75.3 parts of lysine monohydrochloride were suspended. To the resultant suspension, 40.6 parts of caustic soda were added for neutralization, whereby a suspension of lysine was prepared. On the other hand, 100 parts of polysuccinimide having a weight average molecular weight of 96,000 and 500 parts of distilled water as a dispersant (poor solvent) were charged in a high-speed mixer equipped with stirring blades having cutting edges. The polysuccinimide was disintegrated at 15,000 rpm for 1 hour, followed by the addition of the suspension of lysine. After the thus-prepared mixture was stirred and reacted for 20 hours, 500 parts of methanol were charged, whereby a dispersion of a cross-linked polysuccinimide was obtained.

To the dispersion of the cross-linked polysuccinimide, 13.7 parts of a 27 wt. % aqueous solution of caustic soda were added dropwise over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 95 parts of a cross-linked polyaspartic acid resin as a superabsorbent polymer were obtained.

The water absorption of the cross-linked polyaspartic acid resin was 460 times in the case of distilled water and 63 times in the case of physiological saline.

Example A6

In 100 parts of distilled water, 56.4 parts of lysine monohydrochloride were suspended. To the resultant suspension, 25.5 parts of caustic soda were added little by little for neutralization, whereby an aqueous solution of lysine was prepared. On the other hand, 100 parts of polysuccinimide having a weight average molecular weight of 96,000 and 500 parts of methanol as a dispersant (poor solvent) were charged in a high-speed mixer equipped with stirring blades having cutting edges. The polysuccinimide was disintegrated at 15,000 rpm for 1 hour, followed by the addition of the suspension of lysine. The thus-prepared mixture was stirred for 20 hours, whereby a dispersion of a cross-linked polysuccinimide was obtained.

To the dispersion of the cross-linked polysuccinimide, 500 parts of distilled water were added, followed by the dropwise addition of 106.8 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 90 parts of a cross-linked polyaspartic acid resin as a superabsorbent polymer were obtained.

The water absorption of the cross-linked polyaspartic acid resin was 520 times in the case of distilled water and 65 times in the case of physiological saline.

Example A7

In 80 parts of distilled water, 48.0 parts of lysine methyl ester dihydrochloride were suspended. To the resultant suspension, 16.5 parts of caustic soda were added little by little for neutralization, whereby a suspension of lysine methyl ester was prepared. On the other hand, 100 parts of polysuccinimide having a weight average molecular weight of 96,000 were dissolved in 400 parts of DMF under a nitrogen gas stream, followed by the addition of 400 parts of methanol as a dispersant (poor solvent) so that the polysuccinimide was brought into a dispersed state. The suspension of lysine methyl ester was added to the dispersion, followed by stirring at room temperature for 20 hours. The resultant mixture was subjected to suction filtration to collect a precipitate. The precipitate was washed with methanol, whereby a wet cake of a cross-linked polysuccinimide was obtained.

The wet cake of the cross-linked polysuccinimide was dispersed in a mixture of 400 parts of distilled water and 400 parts of methanol, followed by the dropwise addition of 122.1 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 98 parts of a cross-linked polyaspartic acid resin as a superabsorbent polymer were obtained.

The water absorption of the cross-linked polyaspartic acid resin was 450 times in the case of distilled water and 64 times in the case of physiological saline.

Example A8

In 40 parts of distilled water, 7.2 parts of lysine methyl ester dihydrochloride and 22.6 parts of lysine monohydrochloride were dissolved. To the resultant solution, 7.8 parts of caustic soda were added little by little for neutralization, whereby an aqueous solution of lysine was prepared. On the other hand, 100 parts of polysuccinimide having a weight average molecular weight of 96,000 were dissolved in a mixed solvent of 400 parts of DMF and 400 parts of methanol as a dispersant (poor solvent), so that the polysuccinimide was brought into a dispersed state. The aqueous solution of lysine was added to the dispersion, followed by stirring at room temperature for 40 hours. The resultant mixture was subjected to suction filtration to collect a precipitate. The precipitate was washed with methanol, whereby a wet cake of a cross-linked polysuccinimide was obtained.

The wet cake of the cross-linked polysuccinimide was dispersed in a mixture of 400 parts of distilled water and 400 parts of methanol, followed by the dropwise addition of 130 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 94 parts of a cross-linked polyaspartic acid resin as a superabsorbent polymer were obtained.

The water absorption of the cross-linked polyaspartic acid resin was 660 times in the case of distilled water and 67 times in the case of physiological saline.

Example A9

In 40 parts of distilled water, 24.0 parts of lysine methyl ester dihydrochloride and 18.8 parts of lysine monohydrochloride were dispersed. To the resultant dispersion, 12.4 parts of caustic soda were added little by little for neutralization, whereby an aqueous solution of lysine was prepared. On the other hand, 100 parts of polysuccinimide having a weight average molecular weight of 96,000 were dissolved in 400 parts of DMF under a nitrogen gas stream, followed by the addition of the aqueous solution of lysine. After the thus-prepared mixture was stirred at room temperature for 10 minutes, the resulting reaction mixture was charged over 30 minutes into 400 parts of toluene as a dispersant (poor solvent) which were placed in a mixer equipped with high-speed stirring blades driven at 8,000 rpm. Subsequent to a further reaction for 10 hours, the reaction mixture was subjected to suction filtration to collect a precipitate. The precipitate was washed with toluene and then dried at 60° C. for 2 hours, whereby a cross-linked polysuccinimide was obtained.

The cross-linked polysuccinimide (130 parts) was dispersed in a mixture of 400 parts of distilled water and 400 parts of methanol, followed by the dropwise addition of 122.1 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 125 parts of a cross-linked polyaspartic acid resin as a superabsorbent polymer were obtained.

The water absorption of the cross-linked polyaspartic acid resin was 620 times in the case of distilled water and 65 times in the case of physiological saline.

Comparative Example A1

In 40 parts of distilled water, 7.2 parts of lysine methyl ester dihydrochloride and 22.6 parts of lysine monohydrochloride were dissolved. To the resultant solution, 7.8 parts of caustic soda were added little by little for neutralization, whereby an aqueous solution of lysine was prepared. On the other hand, 100 parts of polysuccinimide having a weight average molecular weight of 96,000 were dissolved in 400 parts of DMF under a nitrogen gas stream, followed by the addition of the aqueous solution of lysine. The thus-prepared mixture was then stirred at room temperature. In the course of the stirring, thickening of the reaction mixture proceeded so much that the stirring became no longer feasible. The reaction was therefore conducted for 30 hours without stirring, whereby a reaction product was obtained in the form of a gel.

This gel of the reaction product was added to 1,000 parts of methanol, and the resultant mixture was stirred at room temperature. Because precipitated particles were large, it was impossible to increase the stirring speed. It took more than one day for the disintegration of the entire cross-linked product, namely, this operation was difficult. A precipitate so obtained was collected by suction filtration and washed first with methanol and then with water, whereby a wet cake of a cross-linked polysuccinimide was obtained.

This wet cake of the cross-linked polysuccinimide was suspended in a mixture of 15 parts of distilled water and 15 parts of methanol, followed by the dropwise addition of 7.3 parts of a 24 wt. % aqueous solution of sodium hydroxide so that the pH of the suspension fell within a range of from 11 to 12. After the pH was not found-to drop further, dilute hydrochloric acid was added until the pH of the reaction mixture dropped to 7. The thus-obtained mixture was poured into 100 parts of methanol and the resulting precipitate was dried and disintegrated, whereby 7.6 parts of a cross-linked polyaspartic acid resin as a superabsorbent polymer were obtained.

The water absorption of the cross-linked polyaspartic acid resin was 380 times in the case of distilled water and 59 times in the case of physiological saline.

Comparative Example A2

Lysine methyl ester dihydrochloride (6 parts) was suspended in 200 parts of DMF, followed by the neutralization with 6 parts of triethyLamine. Into the suspension, a solution of 50 parts of polysuccinimide, which had a weight average molecular weight of 130,000, in 250 parts of DMF was charged. After the resultant mixture was stirred for 1 hour at room temperature, 12 parts of triethylamine were added dropwise, followed by a reaction at room temperature for 40 hours. The reaction mixture was poured into ethanol and the resulting precipitate was collected by filtration and then dried, whereby 50 parts of cross-linked polysuccinimide was obtained.

The cross-linked polysuccinimide (26 parts) was suspended in 5,000 parts of distilled water, followed by the dropwise addition of 2 N sodium hydroxide so that the pH of the suspension fell within 9 to 11 to conduct a hydrolysis reaction of the remaining imide rings. The reaction mixture was collected by filtration and then dried, whereby 86 parts of a cross-linked polyaspartic acid resin as a superabsorbent polymer were obtained.

The water absorption of the cross-linked polyaspartic acid resin was 110 times in the case of distilled water and 30 times in the case of physiological saline.

Comparison and Discussion on Examples A1–A9 and Comparative Examples A1–A2

Comparative Example A1 is directed to a conventional process intended to produce a cross-linked polyaspartic acid capable of achieving a high water absorption, and Comparative Example A2 is directed to another conventional process intended to produce a cross-linking polyaspartic acid at high productivity.
Results of Comparative Examples A1–A2 were however not fully good in all aspects, because they did not use any dispersant. Described specifically, the productivity was considerably low in Comparative Example A1, and the water absorption of the resin was significantly low in Comparative Example A2.

In contrast, each of Examples A1–A9 used the dispersant and conducted the cross-linking reaction in the dispersed state. They were hence able to produce at high productivity the cross-linked polyaspartic acid resins which showed the high water absorptions, respectively.

As is evident from the foregoing, advantageous effects can be brought about with respect to water absorption and productivity by using a dispersant in a cross-linking reaction and reacting polysuccinimide in a dispersed state.

(B) EXAMPLES DIRECTED TO A CROSS-LINKING REACTION WITHIN A RANGE OF FROM 3 TO 100 TIMES IN WATER SWELLING DEGREE

Example B1

Under a nitrogen gas stream, 5 parts of polysuccinimide having a weight average molecular weight of 96,000 were dissolved in 20 parts of DMF, followed by the addition of 1.8 parts of lysine methyl ester dihydrochloride and 3.1 parts of triethylamine. After the resultant mixture was stirred at room temperature for 5 hours, the stirring was stopped and the reaction was allowed to proceed for 50 hours. Methanol (100 parts) was added to the reaction mixture, and the resultant mixture was stirred at room temperature for 2 hours to effect reprecipitation. The resulting precipitate was collected by suction filtration, and was then washed with methanol and further with water, whereby a wet cake of a cross-linked polysuccinimide was obtained.

This wet cake of the cross-linked polysuccinimide was suspended in a mixture of 15 parts of distilled water and 15 parts of methanol. While maintaining the swelling degree of the resin within the range of from 3 to 100 times, 7.3 parts of a 24 wt. % aqueous solution of sodium hydroxide were added so that the pH of the suspension fell within a range of from 11 to 12. After the pH was not found to drop further, dilute hydrochloric acid was added until the pH of the reaction mixture dropped to 7. The thus-obtained mixture was poured into 100 parts of methanol and the resulting precipitate was dried and disintegrated, whereby 7.6 parts of a cross-linked polyaspartic acid resin as a superabsorbent polymer were obtained.

The water absorption of the cross-linked polyaspartic acid resin was 480 times in the case of distilled water and 61 times in the case of physiological saline. Further, the volumetric efficiency of the reaction in the hydrolysis was 20.2%.

Example B2

In a similar manner as in Example B1 except for the use of polysuccinimide having a weight average molecular weight of 155,000, 146 parts of a cross-linked polyaspartic acid resin were obtained. The water absorption of the cross-linked polyaspartic acid resin was 550 times in the case of distilled water and 63 times in the case of physiological saline.

Example B3

A wet cake of a cross-linked polysuccinimide, said wet cake having been obtained as in Example B1, was suspended in 30 parts of a 2 wt. % aqueous solution of sodium chloride. While maintaining the swelling degree of the resin within the range of from 3 to 100 times, 8.6 parts of a 24 wt. % aqueous solution of sodium hydroxide were added so that the pH of the suspension fell within a range of from 11 to 12. After the pH was not found to drop further, dilute hydrochloric acid was added until the pH of the reaction mixture dropped to 7. The thus-obtained mixture was poured into 100 parts of methanol and the resulting precipitate was dried and disintegrated, whereby 7.7 parts of a cross-linked polyaspartic acid resin as a superabsorbent polymer were obtained. The water absorption of the cross-linked polyaspartic acid resin was 460 times in the case of distilled water and 60 times in the case of physiological saline. Further, the volumetric efficiency of the reaction in the hydrolysis was 20.4%.

Example B4

A wet cake of a cross-linked polysuccinimide, said wet cake having been obtained as in Example B1, was suspended in a mixed solvent of 25 parts of distilled water and 50 parts of isopropyl alcohol, the temperature of which was 70° C. While maintaining the swelling degree of the resin within the range of from 3 to 100 times, 7.6 parts of a 24 wt. % aqueous solution of sodium hydroxide were added so that the pH of the suspension fell within a range of from 9 to 10. After the pH was not found to drop further, dilute hydrochloric acid was added until the pH of the reaction mixture dropped to 7. The thus-obtained mixture was poured into 100 parts of methanol and the resulting precipitate was dried and disintegrated, whereby 7.2 parts of a cross-linked polyaspartic acid resin as a superabsorbent polymer were obtained. The water absorption of the cross-linked polyaspartic acid resin was 460 times in the case of distilled water and 60 times in the case of physiological saline. Further, the volumetric efficiency of the reaction in the hydrolysis was 12.6%.

Example B5

A wet cake of a cross-linked polysuccinimide, said wet cake having been obtained as in Example B1, was suspended in a mixed solvent of 15 parts of a 2 wt. % aqueous solution of sodium chloride and 8 parts of methanol. While maintaining the swelling degree of the resin within the range of from 3 to 100 times, 8.6 parts of a 24 wt. % aqueous solution of sodium hydroxide were added so that the pH of the suspension fell within a range of from 11 to 12. After the pH was not found to drop further, dilute hydrochloric acid was added until the pH of the reaction mixture dropped to 7. The thus-obtained mixture was poured into 100 parts of methanol and the resulting precipitate was dried and disintegrated, whereby 7.6 parts of a cross-linked polyaspartic acid resin as a superabsorbent polymer were obtained. The water absorption of the cross-linked polyaspartic acid resin was 480 times in the case of distilled water and 61 times in the case of physiological saline. Further, the volumetric efficiency of the reaction in the hydrolysis was 24.8%.

Example B6

In a similar manner as in Example B1 except for the use of 0.15 part of hexamethylenediamine as a cross-linking agent in lieu of lysine methyl ester dihydrochloride, 7.0 parts of a cross-linked polyaspartic acid resin were obtained. The water absorption of the cross-linked polyaspartic acid resin was 380 times in the case of distilled water and 59 times in the case of physiological saline. Further, the volumetric efficiency of the reaction in the hydrolysis was 18.9%.

Example B7

In a similar manner as in Example B1 except that, as the alkaline water employed in the hydrolysis reaction, 8.2 parts of a 30 wt. % aqueous solution of caustic soda were used in place of the 24 wt. % aqueous solution of sodium hydroxide, 7.9 parts of a cross-linked polyaspartic acid resin were obtained. The water absorption of the cross-linked polyaspartic acid resin was 450 times in the case of distilled water and 58 times in the case of physiological saline. Further, the volumetric efficiency of the reaction in the hydrolysis was 18.9%.

Comparative Example B1

A wet cake of a cross-linked polysuccinimide, said wet cake having been obtained as in Example B1, was suspended in 1,000 parts of distilled water. To the thus-obtained suspension, an 8 wt. % aqueous solution of sodium hydroxide was added dropwise so that the pH of the suspension fell within a range of from 10 to 11. The addition of the 8% aqueous solution of caustic soda was continued until the pH was not found to drop further. After no further drop was observed in the pH, dilute hydrochloric acid was added until the pH of the reaction mixture dropped to 7. The thus-obtained mixture was poured into 3,000 parts of acetone and the resulting precipitate was dried and disintegrated, whereby 7.7 parts of a cross-linked polyaspartic acid resin as a superabsorbent polymer were obtained. The water absorption of the cross-linked polyaspartic acid resin was 180 times in the case of distilled water and 38 times in the case of physiological saline. Further, the volumetric efficiency of the reaction in the hydrolysis was 0.8%.

Comparative Example B2

A wet cake of a cross-linked polysuccinimide, said wet cake having been obtained as in Example B1, was suspended in a mixed solvent of 30 parts of distilled water and 90 parts of acetone. To the thus-obtained suspension, an 8 wt. % aqueous solution of sodium hydroxide was added dropwise so that the pH of the suspension fell within a range of from 10 to 11. The addition of the 8% aqueous solution of caustic soda was continued until the pH was not found to drop further. After no further drop was observed in the pH, dilute hydrochloric acid was added until the pH of the reaction mixture dropped to 7. The thus-obtained mixture was poured into 3,000 parts of acetone and the resulting precipitate was dried and disintegrated, whereby 7.1 parts of a cross-linked polyaspartic acid resin as a superabsorbent polymer were obtained. The water absorption of the cross-linked polyaspartic acid resin was 150 times in the case of distilled water and 36 times in the case of physiological saline. Further, the volumetric efficiency of the reaction in the hydrolysis was 5.6%.

Comparison and Discussion on Examples B1–B7 and Comparative Examples B1–B2

In each of Comparative Examples B1–B2, the hydrolysis reaction was conducted without controlling the swelling degree of the resin within the range of from 3 to 100 times, so that the water absorption of the resultant cross-linked polyaspartic acid resin was low and the volumetric efficiency of the reaction in the hydrolysis was very low.

In contrast, in each of Examples B1–B7, the resin was subjected to the hydrolysis reaction while controlling the swelling degree of the resin within the range of from 3 to 100 times, so that the cross-linked polyaspartic acid resin capable of showing the large water absorption was obtained and the volumetric efficiency of the reaction in the hydrolysis was high.

As is evident from the foregoing, advantageous effects can be brought about with respect to water absorption and volumetric efficiency by conducting a hydrolysis reaction of imide rings of a cross-linked polysuccinimide while maintaining the swelling degree of the resin within the range of from 3 to 100 times inside the reaction system.

(C) EXAMPLES DIRECTED TO THE USE OF A CROSS-LINKED POLYSUCCINIMIDE, WHICH HAS BEEN OBTAINED BY SUBJECTING A GEL TO WET DISINTEGRATION, AND A HYDROLYSIS REACTION WITHIN THE RANGE OF FROM 3 TO 100 TIMES IN SWELLING DEGREE

Example C1

In 40 parts of distilled water, 7.2 parts of lysine methyl ester dihydrochloride and 22.6 parts of lysine monohydrochloride were dissolved. To the resultant solution, 7.8 parts of caustic soda were added little by little for neutralization, whereby an aqueous solution of lysine was prepared. On the other hand, 100 parts of polysuccinimide having a weight average molecular weight of 96,000 were dissolved in 400 parts of DMF under a nitrogen gas stream, followed by the addition of the aqueous solution of lysine. After the thus-prepared mixture was stirred at room temperature for 1 hour, the stirring was stopped and the reaction was continued for 20 hours, whereby a gel of a cross-linked polysuccinimide was obtained. This gel of the cross-linked polysuccinimide was transferred into a mixer equipped with stirring blades having cutting edges, and 400 parts of distilled water and 400 parts of methanol were added. The gel was then disintegrated at 8,000 rpm for 5 minutes.

While maintaining the swelling degree of the resin within the range of from 3 to 100 times, 129.7 parts of a 27 wt. % aqueous solution of caustic soda were added dropwise into the mixer over 2 hours. Subsequent to completion of the dropwise addition, the contents were stirred further for 2 hours. A 7 wt. % aqueous solution of hydrochloric acid was then added so that the resulting mixture was neutralized to pH 7. After completion of the neutralization, 300 parts of methanol were added further and the resulting precipitate was collected and dried at 60° C., whereby 145 parts of a cross-linked polyaspartic acid resin as a superabsorbent polymer were obtained.

The water absorption of the cross-linked polyaspartic acid resin was 860 times in the case of distilled water and 70 times in the case of physiological saline.

Example C2

In a similar manner as in Example C1 except for the use of polysuccinimide having a weight average molecular weight of 155,000, 146 parts of a cross-linked polyaspartic acid resin were obtained. The water absorption of the cross-linked polyaspartic acid resin was 1,050 times in the case of distilled water and 72 times in the case of physiological saline.

Example C3

An aqueous solution of lysine was prepared in a similar manner as in Example C1. On the other hand, 100 parts of polysuccinimide having a weight average molecular weight of 96,000 were dissolved in 400 parts of DMF under a nitrogen gas stream, followed by the addition of the aqueous solution of lysine. In a reactor equipped with a high-speed ribbon stirrer, they were reacted at room temperature for 20 hours without stirring, whereby a gel of a cross-linked polysuccinimide was obtained. This gel of the cross-linked polysuccinimide was disintegrated as was in the reactor equipped with the high-speed ribbon stirrer.

Distilled water (400 parts) and methanol (400 parts) were charged into the mixer. While maintaining the swelling degree of the resin within the range of from 3 to 100 times, 129.7 parts of a 27 wt. % aqueous solution of caustic soda were added dropwise over 2 hours. Subsequent to completion of the dropwise addition, the contents were stirred further for 2 hours. A 7 wt. % aqueous solution of hydrochloric acid was added so that the resulting mixture was neutralized to pH 7. After completion of the neutralization, 300 parts of methanol were added further and the resulting precipitate was collected and dried at 60° C., whereby 145 parts of a cross-linked polyaspartic acid resin as a superabsorbent polymer were obtained.

The water absorption of the cross-linked polyaspartic acid resin was 850 times in the case of distilled water and 69 times in the case of physiological saline.

Example C4

In a similar manner as in Example C1 except that, instead of lysine methyl ester dihydrochloride, an aqueous solution of a cross-linking agent was prepared using 3.0 parts of hexamethylenediamine and was employed, 136 parts of a cross-linked polyaspartic acid resin were obtained. The water absorption of the cross-linked polyaspartic acid resin was 780 times in the case of distilled water and 68 times in the case of physiological saline.

Example C5

In a similar manner as in Example C1 except that, instead of lysine methyl ester dihydrochloride, an aqueous solution of a cross-linking agent was prepared using 3.5 parts of m-xylylenediamine and was employed, 132 parts of a cross-linked polyaspartic acid resin were obtained. The water absorption of the cross-linked polyaspartic acid resin was 740 times in the case of distilled water and 66 times in the case of physiological saline.

Comparison and Discussion on Examples C1–C5

In Examples C1–C5 the cross-linked polyaspartic acid resins which showed the high water absorptions were obtained because, as in Examples B1–B7, the resins were subjected to hydrolysis while maintaining their swelling degrees within the range of from 3 to 100 times. It was also possible to produce the cross-linked polyaspartic acid resins, which can achieve high water absorptions, at high productivity since the gels of the cross-linked polysuccinimides were used by subjecting them to wet disintegration. In contrast, the productivity was considerably low in Comparative Example A1, and the water absorption of the resin was significantly low in Comparative Example A2.

(D) EXAMPLES DIRECTED TO THE USE OF A LYSINE SALT AND/OR AN ORNITHINE SALT AS A CROSS-LINKING AGENT

Example D2

In 80 parts of distilled water, 37.6 parts of lysine monohydrochloride were dispersed. To the resultant dispersion, 9.5 parts of caustic soda were added for neutralization, whereby an aqueous solution of lysine/lysine sodium salt was prepared. On the other hand, 100 parts of polysuccinimide having a weight average molecular weight of 96,000 were dissolved in 400 parts of DMF under a nitrogen gas stream, followed by the addition of the aqueous solution of lysine. After the thus-prepared mixture was stirred at room temperature for 10 minutes, 400 parts of methanol as a dispersant (poor solvent) were charged for dispersion, followed by a reaction for 20 hours. After the reaction, the reaction mixture was subjected to suction filtration to collect a precipitate. The precipitate was washed with methanol, whereby a wet cake of a cross-linked polysuccinimide was obtained.

The wet cake of the cross-linked polysuccinimide was dispersed in a mixture of 400 parts of distilled water and 400 parts of methanol, followed by the dropwise addition of 122 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, the mixture was poured into 300 parts of methanol, followed by stirring for 1 hour. A resultant precipitate was collected by filtration and then dried at 60° C., whereby 140 parts of a cross-linked polyaspartic acid resin as a superabsorbent polymer were obtained.

The water absorption of the cross-linked polyaspartic acid resin was 920 times in the case of distilled water and 74 times in the case of physiological saline.

Example D2

In 20 parts of distilled water, 9.4 parts of lysine monohydrochloride were dispersed. To the resultant dispersion, 2.1 parts of caustic soda were added for neutralization, whereby an aqueous solution of lysine sodium was prepared. On the other hand, 100 parts of polysuccinimide having a weight average molecular weight of 96,000 were dissolved in 400 parts of DMF under a nitrogen gas stream, followed by the addition of the aqueous solution of lysine sodium. After the thus-prepared mixture was stirred at room temperature for 1 hour, the stirring was stopped and the reaction was continued for 20 hours, whereby a gel of a cross-linked polysuccinimide was obtained. This gel of the cross-linked polysuccinimide was transferred into a mixer equipped with stirring blades having cutting edges, and 400 parts of distilled water and 400 parts of methanol were added. The gel was then disintegrated at 8,000 rpm for 5 minutes.

While maintaining the swelling degree of the resin within the range of from 3 to 100 times, 145.0 parts of a 27 wt. % aqueous solution of caustic soda were added dropwise into the mixer over 2 hours. Subsequent to completion of the dropwise addition, the contents were stirred further for 2 hours. A 7 wt. % aqueous solution of hydrochloric acid was then added so that the resulting mixture was neutralized to pH 7. After completion of the neutralization, 300 parts of methanol were added further and the resulting precipitate was collected and dried at 60° C., whereby 131 parts of a cross-linked polyaspartic acid resin as a superabsorbent polymer were obtained.

The water absorption of the c:ross-linked polyaspartic acid resin was 860 times in the case of distilled water and 70 times in the case of physiological saline.

Discussion on Examples D1–D2

In Example D1, the cross-linked polyaspartic acid resin which showed the high water absorption was successfully obtained because, as in Examples A1–A9, the dispersant was used and the cross-linking reaction was conducted in a dispersed state. In Example D2, the cross-linked polyaspartic acid resin which also exhibited the high water absorption was obtained because, as in Examples B1–B7, the resin was subjected to hydrolysis while maintaining its swelling degree within the range of from 3 to 100 times.

Moreover, owing to the use of the lysine salt as a cross-linking agent, Examples D1-D2 were able to provide the cross-linked polyaspartic acid resins with still higher safety.

(E) EXAMPLES DIRECTED TO THE WASHING OF A GEL OF A CROSS-LINKED POLYASPARTIC ACID RESIN

Example E1

Under a nitrogen gas stream, 5 parts of polysuccinimide having a weight average molecular weight of 96,000 were dissolved in 20 parts of DMF, followed by the addition of 1.8 parts of lysine methyl ester dihydrochloride and 3.1 parts of triethylamine. The resultant mixture was stirred at room temperature for 20 hours. Methanol (100 parts) was added to the reaction mixture, and the resultant mixture was stirred at room temperature for 2 hours to disintegrate the resulting gel. The resulting precipitate was collected by suction filtration, and was then washed with methanol and further with water, whereby a wet cake of a cross-linked polysuccinimide was obtained.

This wet cake of the cross-linked polysuccinimide was suspended in a mixture of 30 parts of distilled water and 90 parts of methanol. An 8 wt. % aqueous solution of sodium hydroxide was added so that the pH of the suspension fell within a range of from 11 to 12. The addition of the aqueous alkaline solution was continued until no further drop was observed in the pH. After the pH was not found to drop further, dilute hydrochloric acid was added until the pH of the reaction mixture dropped to 7. Distilled water (50 parts) were added to the resulting precipitate to induce gelation. The thus-formed gel was collected by filtration through a sieve having 425 $\mu$m openings, washed thoroughly with distilled water, and then dried, whereby 6.9 parts of a cross-linked polyaspartic acid resin as a superabsorbent polymer were obtained.

The water absorption of the cross-linked polyaspartic acid resin was 490 times in the case of distilled water and 62 times in the case of physiological saline. Further, the strength of the gel was $20/16$ inch.

Example E2

In a similar manner as in Example E1, a cross-linked polysuccinimide was hydrolyzed and then neutralized. After that, 15 parts of distilled water and 15 parts of methanol were added to the resulting precipitate to induce gelation. The resulting gel was collected by filtration through a sieve having 200 $\mu$m openings, washed twice with 15 parts of a 50 wt. % aqueous solution of methanol, and then dried, whereby 7.2 parts of a cross-linked polyaspartic acid resin as a superabsorbent polymer were obtained. The water absorption of the cross-linked polyaspartic acid resin was 550 times in the case of distilled water and 64 times in the case of physiological saline. Further, the strength of the gel was $20/16$ inch.

Example E3

In a similar manner as in Example E1, a cross-linked polysuccinimide was hydrolyzed and then neutralized. After that, 15 parts of distilled water and 18 parts of methanol were added to the resulting precipitate to induce gelation in the form of a slurry. The resulting gel was poured little by little into 50 parts of methanol over 30 minutes so that the gel was caused to reprecipitate. The thus-obtained precipitate was collected and then dried, whereby 7.7 parts of a cross-linked polyaspartic acid resin as a superabsorbent polymer were obtained. The water absorption of the cross-linked polyaspartic acid resin was 450 times in the case of distilled water and 61 times in the case of physiological saline. Further, the strength of the gel was $20/16$ inch.

Comparative Example E1

In a similar manner as in Example E1, a cross-linked polysuccinimide was hydrolyzed and then neutralized. After that, the resulting precipitate was dried as was at 60° C. and was then ground, whereby 7.6 parts of a cross-linked polyaspartic acid resin as a superabsorbent polymer were obtained. The water absorption of the cross-linked polyaspartic acid resin was 160 times in the case of distilled water and 37 times in the case of physiological saline. Further, the strength of the gel was $8/16$ inch.

Comparison and Discussion on Examples E1–E3 and Comparative Example E1

Comparative Example E1 resulted in the small water absorption and the inferior gel strength because the gel of the cross-linked polyaspartic acid resin was used as was without conducting its washing.

In contrast, each of Examples E1–E3 produced the cross-linked polyaspartic acid resin which showed the large water absorption and had the excellent gel strength, because the gel of the cross-linked polyaspartic acid resin was washed.

As is evident from the foregoing, advantageous effects can be brought about with respect to water absorption and gel strength when a gel of a cross-linked polyaspartic acid resin, which has been obtained by hydrolysis, is washed as is with water and/or a water-miscible organic solvent.

(F) EXAMPLES DIRECTED TO THE PROVISION OF A RESIN OF A HIGH WATER ABSORPTION SPEED

In each of the subsequent Examples, a water absorption (W10) for distilled water was measured 10 minutes later by similar procedures, and its percentage relative to an absorption (W60) one hour later was calculated as an index for making a comparison in water absorption speed. Incidentally, in view of variations in water absorption speed by resin particle sizes, resins sifted to have particle sizes only in a range of from 100 to 500 µm were used for the measurement.

Example F1

In 1.5 g of distilled water, 2.78 g (0.015 mol) of lysine monohydrochloride were dissolved, followed by the addition of 2.44 g (0.015 mol) of a 24.5 wt. % aqueous solution of sodium hydroxide for neutralization. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 1 hour. After that, 38.8 g of methanol were added to bring the reaction system into a dispersed state, followed by aging at 25° C. for 3 hours. A 24.5 wt. % aqueous solution of sodium hydroxide (1.63 g, 0.01 mol) was then added dropwise and a cross-linking reaction was conducted at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, a 24.5 wt. % aqueous solution of sodium hydroxide was added dropwise to conduct hydrolysis at 25 to 35° C. and pH 9 to 11.5. The consumption of the 24.5 wt. % aqueous solution of sodium hydroxide was 13.8 g (0.085 mol), and 3 hours were required until the reaction was brought to completion. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 10.5 g of a cross-linked polyaspartic acid resin as a superabsorbent polymer were obtained.

The water absorption of the cross-linked polyaspartic acid resin was 1,090 times in the case of distilled water and 96 times in the case of physiological saline.

Further, W10/W60×100 was 60.2%.

Example F2

In 1.5 g of distilled water, 2.78 g (0.015 mol) of lysine monohydrochloride were dissolved, followed by the addition of 2.44 g (0.015 mol) of a 24.5 wt. % aqueous solution of sodium hydroxide for neutralization. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 1 hour. After that, 38.8 g of methanol were added to bring the reaction system into a dispersed state, followed by aging at 25° C. for 3 hours. A 24.5 wt. % aqueous solution of sodium hydroxide (2.44 g, 0.015 mol) was then added dropwise and a cross-linking reaction was conducted at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, 13.5 g (0.083 mol) of a 24.5 wt. % aqueous solution of sodium hydroxide were added dropwise over 3 hours to conduct hydrolysis at 25 to 35° C. and pH 9 to 11.5. The resulting reaction mixture was subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 12.3 g of a cross-linked polyaspartic acid resin as a superabsorbent polymer were obtained.

The water absorption of the cross-linked polyaspartic acid resin was 690 times in the case of distilled water and 75 times in the case of physiological saline.

Further, W10/W60×100 was 75.9%.

Example F3

In 1.5 g of distilled water, 3.70 g (0.020 mol) of lysine monohydrochloride were dissolved, followed by the addition of 3.27 g (0.020 mol) of a 24.5 wt. % aqueous solution of sodium hydroxide for neutralization. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 1 hour. After that, 38.8 g of methanol were added to bring the reaction system into a dispersed state, followed by aging at 25° C. for 3 hours. A 24.5 wt. % aqueous solution of sodium hydroxide (1.63 g, 0.010 mol) was then added drc,pwise and a cross-linking reaction was conducted at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, 13.5 g (0.083 mol) of a 24.5 wt. % aqueous solution of sodium hydroxide was added dropwise over 3 hours to conduct hydrolysis at 25 to 35° C. and pH 9 to 11.5. The resulting reaction mixture was subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 12.3 g of a cross-linked polyaspartic acid resin as a superabsorbent polymer were obtained.

The water absorption of the cross-linked polyaspartic acid resin was 600 times in the case of distilled water and 83 times in the case of physiological saline.

Further, W10/W60×100 was 61.9%.

Example F4

In 1.5 g of distilled water, 4.63 g (0.025 mol) of lysine monohydrochloride were dissolved, followed by the addition of 4.08 g (0.025 mol) of a 24.5 wt. % aqueous solution of sodium hydroxide for neutralization. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 1 hour. After that, 38.8 g of methanol were added to bring the reaction system into a dispersed state, followed by aging at 25° C. for 3 hours. A 24.5 wt. % aqueous solution of sodium hydroxide (1.63 g, 0.010 mol) was then added dropwise and a cross-linking reaction was conducted at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, 13.5 g (0.083 mol) of a 24.5 wt. % aqueous solution of sodium hydroxide was added dropwise over 3 hours to conduct hydrolysis at 25 to 35° C. and pH 9 to 11.5. The resulting reaction mixture was subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 14.8 g of a cross-linked polyaspartic acid resin as a superabsorbent polymer were obtained.

The water absorption of the cross-linked polyaspartic acid resin was 450 times in the case of distilled water and 48 times in the case of physiological saline.

Further, W10/W60×100 was 62.7%.

Example F5

A wet cake of a cross-linked polysuccinimide was obtained following the procedures of Example F1.

The thus-obtained wet cake was suspended in 120 g of methanol. To the suspension, an aqueous glycine solution which had been prepared by dissolving 7.73 g (0.1 mol) of glycine and 4.2 g of NaOH in 30 g of distilled water was added dropwise, followed by a reaction at 25° C. for 24 hours. The reaction mixture was then neutralized to pH 7.5 with a 9 wt. % aqueous solution of hydrochloric acid. The resulting precipitate was collected by filtration, washed and then dried, whereby 18.1 g of a cross-linked polysuccinimide derivative with glycine introduced as pendant groups were obtained as a superabsorbent polymer.

The water absorption of the cross-linked polysuccinimide derivative was 720 times in the case of distilled water and 79 times in the case of physiological saline.

Further, W10/W60×100 was 75.5%.

Example F6

In 1.5 g of distilled water, 2.78 g (0.015 mol) of lysine monohydrochloride were dissolved, followed by the addition of 4.08 g (0.025 mol) of a 24.5 wt. % aqueous solution of sodium hydroxide for neutralization. The solution was dissolved in 38.8 g of methanol. The resultant solution was added dropwise over 1 hour into a solution of 9.71 g (0.10 mol) of polysuccinimide, the weight average molecular weight of which was 96,000, in 38.8 g of DMF. The resultant mixture was reacted at 25° C. for 10 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, a 24.5 wt. % aqueous solution of sodium hydroxide was added dropwise to conduct hydrolysis at 25 to 35° C. and pH 9 to 11.5. The consumption of the 24.5 wt. % aqueous solution of sodium hydroxide was 13.1 g (0.08 mol), and 4 hours were required until the reaction was brought to completion. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 13.3 g of a cross-linked polyaspartic acid resin as a superabsorbent polymer were obtained.

The water absorption of the cross-linked polyaspartic acid resin was 480 times in the case of distilled water and 51 times in the case of physiological saline.

Further, W10/W60×100 was 92.7%.

Example F7

A wet cake of a cross-linked polysuccinimide was obtained following the procedures of Example F6 except that the cross-linking reaction time was changed to 5 hours.

The wet cake was subjected to hydrolysis in a similar manner as in Example F6, whereby 11.1 g of a cross-linked polyaspartic acid resin as a superabsorbent polymer were obtained.

The water absorption of the cross-linked polyaspartic acid resin was 600 times in the case of distilled water and 60 times in the case of physiological saline.

Further, W10/W60×100 was 91.1%.

Example F8

In 2.0 g of distilled water, 3.70 g (0.020 mol) of lysine monohydrochloride were dissolved, followed by the addition of 4.90 g (0.030 mol) of a 24.5 wt. % aqueous solution of sodium hydroxide for neutralization. The solution was dissolved in 38.8 g of methanol. The resultant solution was added dropwise over 1 hour into a solution of 9.71 g (0.10 mol) of polysuccinimide, the weight average :molecular weight of which was 96,000, in 38.8 g of DMF. The resultant mixture was reacted at 25° C. for 10 hours. The resulting precipitate was collected by filtration and then washed, whereby a wet cake of a cross-linked polysuccinimide was obtained.

The wet cake was suspended in a mixture of 83.1 g of water and 116.5 g of methanol. Hydrolysis was conducted while adding 13.1 g of a 24.5 wt. % aqueous solution of sodium hydroxide dropwise to the suspension over 3 hours at 25 to 35° C. and pH 9 to 11. The resulting reaction mixture was then subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 14.0 g of a cross-linked polyaspartic acid resin as a superabsorbent polymer were obtained.

The water absorption of the cross-linked polyaspartic acid resin was 310 times in the case of distilled water and 43 times in the case of physiological saline.

Further, W10/W60×100 was 93.5%.

Example F9

In 1.5 g of distilled water, 2.78 g (0.015 mol) of lysine monohydrochloride were dissolved, followed by the addition of 4.08 g (0.025 mol) of a 24.5 wt. % aqueous solution of sodium hydroxide for neutralization. The resultant solution and 12.9 g of methanol were added dropwise over 0.5 hour through different inlets to a solution of 9.71 g (0.10 mol) of polysuccinimide, the weight average molecular weight of which was 96,000, in 38.8 g of DMF. After that, 25.9 g of methanol were added, and a cross-linking reaction was conducted at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, a 24.5 wt. % aqueous solution of sodium hydroxide was added dropwise to conduct hydrolysis at 25 to 35° C. and pH 9 to 11.5. The resulting reaction mixture was subjected to aging for 1 hour. Three hours were required until the pH became constant. The mixture was then subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 12.7 g of a cross-linked polyaspartic acid resin as a superabsorbent polymer were obtained.

The water absorption of the cross-linked polyaspartic acid resin was 580 times in the case of distilled water and 60 times in the case of physiological saline.

Further, W10/W60×100 was 93.5%.

Example F10

In 1.5 g of distilled water, 2.78 g (0.015 mol) of lysine monohydrochloride were dissolved, followed by the addition of 4.08 g (0.025 mol) of a 24.5 wt. % aqueous solution of sodium hydroxide for neutralization. The solution was dissolved in 38.8 g of methanol. The resultant solution was added dropwise over 1 hour into a solution of 9.71 g (0.10 mol) of polysuccinimide, the weight average molecular weight of which was 96,000, in 38.8 g of DMF. The resultant mixture was reacted at 25° C. for 10 hours. The resulting precipitate was collected by filtration and then washed, whereby a wet cake of a cross-linked polysuccinimide was obtained.

The wet cake was suspended in 116.5 g of methanol. To the suspension, an aqueous glycine solution which had been prepared by dissolving 7.73 g (0.1 mol) of glycine and 4.2 g of sodium hydroxide in 30 g of distilled water was added dropwise, followed by a reaction at 25° C. for 24 hours. The reaction mixture was then neutralized to pH 7.5 with a 9 wt. % aqueous solution of hydrochloric acid. The resulting precipitate was collected by filtration, washed and then dried, whereby 18.8 g of a cross-linked polysuccinimide derivative with glycine introduced as pendant groups were obtained as a superabsorbent polymer.

The water absorption of the cross-linked polysuccinimide derivative was 490 times in the case of distilled water and 53 times in the case of physiological saline.

Further, W10/W60×100 was 92.1%.

Example F11

The procedures of Example F6 were repeated except for the use of 1.74 g (0.02 mol) of hexamethylenediamine in place of lysine monohydrochloride, whereby 10.5 g of a cross-linked polyaspartic acid resin as a superabsorbent polymer were obtained.

The water absorption of the cross-linked polysuccinimide derivative was 61 times in the case of distilled water and 25 times in the case of physiological saline.

Further, W10/W60×100 was 95.2%.

Example F12

In 1.0 g of distilled water, 1.35 g (0.01 mol) of lysine monohydrochloride were dissolved, followed by the addition of 1.64 g (0.01 mol) of a 24.5 wt. % aqueous solution of sodium hydroxide to neutralize hydrochloric acid. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 1 hour. After that, 38.8 g of methanol were added to bring the reaction system into a dispersed state, and 1.64 g (0.01 mol) of a 24.5 wt. % aqueous solution of sodium hydroxide were then added and a cross-linking reaction was conducted at 25° C. for 3 hours. On the other hand, 0.93 g of lysine monohydrochloride was dissolved in 1.0 g of distilled water, followed by the neutralization with 1.64 g (0.01 mol) of a 24.5 wt. % aqueous solution of sodium hydroxide. The solution was added dropwise to the cross-linked reaction mixture over 0.5 hour, followed by aging at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, a 24.5 wt. % aqueous solution of sodium hydroxide was added dropwise to conduct hydrolysis at 25 to 35° C. and pH 9 to 11.5. The consumption of the 24.5 wt. % aqueous solution of sodium hydroxide was 13.8 g (0.085 mol), and 3 hours were required until the reaction was brought to completion. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 12.5 g of a cross-linked polyaspartic acid resin as a superabsorbent polymer were obtained.

The water absorption of the cross-linked polyaspartic acid resin was 520 times in the case of distilled water and 65 times in the case of physiological saline.

Further, W10/W60×100 was 70.1%.

Example F13

In 1.0 g of distilled water, 1.85 g (0.01 mol) of lysine monohydrochloride were dissolved, followed by the addition of 1.64 g (0.01 mol) of a 24.5 wt. % aqueous solution of sodium hydroxide to neutralize hydrochloric acid. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 1 hour. After that, 38.8 g of methanol were added to bring the reaction system into a dispersed state, and 0.82 g (0.005 mol) of a 24.5 wt. % aqueous solution of sodium hydroxide were then added and a cross-linking reaction was conducted at 25° C. for 3 hours. On the other hand, 0.93 g (0.005 mol) of lysine monohydrochloride was dissolved in 1.0 g of distilled water, followed by the neutralization with 1.64 g (0.01 mol) of a 24.5 wt. % aqueous solution of sodium hydroxide. The solution was added dropwise to the cross-linked reaction mixture over 0.5 hour, followed by aging at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, 13.5 g (0.083 mol) of a 24.5 wt. % aqueous solution of sodium hydroxide was added dropwise over 3 hours to conduct hydrolysis at 25 to 35° C. and pH 9 to 11.5. The resulting reaction mixture was subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 11.3 g of a cross-linked polyaspartic acid resin as a superabsorbent polymer were obtained.

The water absorption of the cross-linked polyaspartic acid resin was 537 times in the case of distilled water and 69 times in the case of physiological saline.

Further, W10/W60×100 was 71.7%.

Example F14

In 1.0 g of distilled water, 0.56 g (0.003 mol) of lysine monohydrochloride was dissolved, followed by the addition of 0.98 g (0.006 mol) of a 24.5 wt. % aqueous solution of sodium hydroxide to neutralize hydrochloric acid. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 30 minutes. After that, 38.8 g of methanol were added to bring the reaction system into a dispersed state. On the other hand, 2.24 g (0.012 mol) of lysine monohydrochloride was dissolved in 1.0 g of distilled water, followed by the neutralization with 3.92 g (0.024 mol) of a 24.5 wt. % aqueous solution of sodium hydroxide. The solution was added dropwise to the cross-linked reaction mixture over 0.5 hour, followed by aging at 25° C. for 20 hours. The resulting precipitate was collected by filtration and then washed, whereby a wet cake of a cross-linked polysuccinimide was obtained.

The wet cake was suspended in a mixture of 83.1 g of water and 116.5 g of methanol. Into the suspension, 13.5 g (0.083 mol) of a 24.5 wt. % aqueous solution of sodium hydroxide was added dropwise over 3 hours to conduct hydrolysis at 25 to 35° C. and pH 9 to 11.5. The resulting reaction mixture was subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 12.8 g of a cross-linked polyaspartic acid resin as a superabsorbent polymer were obtained.

The water absorption of the cross-linked polyaspartic acid resin was 452 times in the case of distilled water and 57 times in the case of physiological saline.

Further, W10/W60×100 was 83.3%.

Example F15

In 1.0 g of distilled water, 0.56 g (0.003 mol) of lysine monohydrochloride was dissolved, followed by the addition of 0.98 g (0.006 mol) of a 24.5 wt. % aqueous solution of sodium hydroxide to neutralize hydrochloric acid. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 30 minutes. On the other hand, 2.24 g (0.012 mol) of lysine monohydrochloride was dissolved in 1.0 g of distilled water, followed by the neutralization with 3.92 g (0.024 mol) of a 24.5 wt. % aqueous solution of sodium hydroxide. The solution was mixed with 38.8 g of methanol, and the resultant mixture was added dropwise to the cross-linked reaction mixture over 0.5 hour, followed by aging at 25° C. for 20 hours. The resulting precipitate was collected by filtration and then washed, whereby a wet cake of a cross-linked polysuccinimide was obtained.

The wet cake was suspended in. a mixture of 83.1 g of water and 116.5 g of methanol. Into the suspension, 13.5 g (0.083 mol) of a 24.5 wt. % aqueous solution of sodium hydroxide was added dropwise over 3 hours to conduct hydrolysis at 25 to 35° C. and pH 9 to 11.5. The resulting reaction mixture was subjected to aging for 1 hour. Hydrochloric acid was added to the thus-hydrolyzed mixture to adjust its pH to 7 to 7.5, and the resulting precipitate was collected by decantation. Water (20 g) was added to the thus-obtained precipitate so that the precipitate was converted into a slurry. The slurry was poured into 200 g of methanol to conduct reprecipitation. The resulting precipitate was collected by filtration, washed and then dried, whereby 14.8 g of a cross-linked polyaspartic acid resin as a superabsorbent polymer were obtained.

The water absorption of the cross-linked polyaspartic acid resin was 600 times in the case of distilled water and 71 times in the case of physiological saline.

Further, W10/W60×100 was 91.3%.

Example F16

In 1.0 g of distilled water, 1.85 g (0.01 mol) of lysine monohydrochloride were dissolved, followed by the addition of 1.64 g (0.01 mol) of a 24.5 wt. % aqueous solution of sodium hydroxide to neutralize hydrochloric acid. The resultant solution was added dropwise over 0.5 hour into a solution of 9.71 g (0.10 mol) of polysuccinimide, the weight average molecular weight of which was 96,000, in 38.8 g of DMF, and the resultant mixture was reacted for 1 hour. After that, 38.8 g of methanol were added to bring the reaction system into a dispersed state, and 1.64 g (0.01 mol) of a 24.5 wt. % aqueous solution of sodium hydroxide were then added and a cross-linking reaction was conducted at 25° C. for 3 hours. On the other hand, 0.93 g (0.005 mol) of lysine monohydrochloride was dissolved in 1.0 g of distilled water, followed by the neutralization with 1.64 g (0.01 mol) of a 24.5 wt. % aqueous solution of sodium hydroxide. The solution was added dropwise to the cross-linked reaction mixture over 0.5 hour, followed by aging at 25° C. for 20 hours. The resulting precipitate was collected by filtration and then washed, whereby a wet cake of a cross-linked polysuccinimide was obtained.

The wet cake was suspended in 116.5 g of methanol. To the suspension, an aqueous glycine solution which had been prepared by dissolving 7.73 g (0.1 mol) of glycine and 4.2 g of sodium hydroxide in 30 g of distilled water was added dropwise, followed by a reaction at 25° C. for 24 hours. The reaction mixture was then neutralized to pH 7.5 with a 9 wt. % aqueous solution of hydrochloric acid. The resulting precipitate was collected by filtration, washed and then dried, whereby 18.8 g of a cross-linked polysuccinimide derivative with glycine introduced as pendant groups were obtained as a superabsorbent polymer.

The water absorption of the cross-linked polysuccinimide derivative was 492 times in the case of distilled water and 51 times in the case of physiological saline.

Further, W10/W60×100 was 86.3%.

Comparative Example F1

In 1.5 g of distilled water, 2.78 g (0.015 mol) of lysine monohydrochloride were dissolved, followed by the addition of 4.08 g (0.025 mol) of a 24.5 wt. % aqueous solution of sodium hydroxide for neutralization. The resultant solution was added dropwise over 0.5 hour into a solution of 9.71 g (0.10 mol) of polysuccinimide, the weight average molecular weight of which was 96,000, in 38.8 g of DMF. In the course of the addition, the viscosity increased substantially and the reaction mixture was gelled in its entirety, so that stirring became no longer feasible. After that, the reaction mixture was therefore subjected to aging at 25° C. for 30 hours without stirring. Methanol (100 g) was added to the resultant gel in an attempt to disintegrate it. It however took approximately 20 hours to disintegrate the gel in its entirety because stirring was difficult. The thus-obtained precipitate was collected by filtration and washed, whereby a wet cake of a cross-linked polysuccinimide was obtained.

The wet cake was suspended in a mixture of 90 g of water and 120 g of methanol. Into the suspension, 13.1 g of a 24.5 wt. % aqueous solution of sodium hydroxide was added dropwise at 25 to 35° C. and pH 9 to 11, whereby hydrolysis was conducted. As the precipitate had a large particle size, the reaction was slow and about 6 hours were required for the hydrolysis. A 9 wt. % aqueous solution of hydrochloric acid was then added to adjust the pH to 7.5, and the resulting precipitate was collected by decantation. Water (20 g) was added to the thus-obtained precipitate so that the precipitate was converted into a slurry. The slurry so obtained was poured into 200 g of methanol to conduct reprecipitation. The resulting precipitate was collected by filtration, washed and then dried, whereby 8.8 g of a cross-linked polyaspartic acid resin as a superabsorbent polymer were obtained.

The water absorption of the cross-linked polyaspartic acid resin was 400 times in the case of distilled water and 53 times in the case of physiological saline.

Further, W10/W60×100 was 60.7%.

Comparative Example F2

To a solution of 9.71 of polysuccinimide, the weight average molecular weight of which was 96,000, in 38.8 g of DMF, 1.74 g (0.015 mol) of hexamethylenediamine were added. Five minutes later, the reaction mixture was gelled in its entirety. The thus-obtained gel was allowed to stand overnight. As a result, DMF oozed out of the gel. The gel was separated, washed with methanol and then dried, whereby a cross-linked polysuccinimide was obtained.

The thus-obtained polymer was powdered in a grinder and then suspended in a mixture of 90 g of water and 120 g of methanol. Hydrolysis was conducted while controlling the pH at 9 to 11 by adding a 24.5 wt. % aqueous solution of sodium hydroxide dropwise. It took 50 hours until the reaction was brought to completion. The thus-obtained hydrolyzed mixture was poured into 500 g of methanol to Conduct reprecipitation. The resulting precipitate was collected by filtration, washed and then dried, whereby 3.5 g of a cross-linked polyaspartic acid resin as a superabsorbent polymer were obtained.

The water absorption of the cross-linked polyaspartic acid resin was 22 times in the case of distilled water and 10 times in the case of physiological saline.

Further, W10/W60×100 was 78.6%.

Comparative Example F3

In 100 g of DMF, 3.50 g (0.015 mol) of lysine methyl ester dihydrochloride were suspended, followed by neutralization with an equimolar amount of triethylamine. The resulting solution was added dropwise into a solution of 9.71 g (0.10 mol) of polysuccinimide, the weight average molecular weight of which was 96,000, in 38.8 g of DMF, followed by stirring for 1 hour. Triethylamine (3.03 g, 0.030 mol) was then added, and a. cross-linking reaction was conducted at 25° C. for 40 hours. The reaction mixture was poured into 300 g of ethanol to conduct reprecipitation. The resulting precipitate was collected by filtration and washed, whereby a wet cake of a cross-linked polysuccinimide was obtained.

The thus-obtained wet cake was suspended in 2,000 g of water. Hydrolysis was conducted while adding a 24.5 wt. % aqueous solution of sodium hydroxide dropwise to control the pH within a range of from 9 to 11. The thus-obtained reaction mixture (flowable gel) was poured into 5,000 mt of ethanol to conduct reprecipitation. The resulting precipitate was collected by filtration, washed and then dried, whereby 12.8 g of a cross-linked polyaspartic acid resin as a superabsorbent polymer were obtained.

The water absorption of the cross-linked polyaspartic acid resin was 110 times in the case of distilled water and 30 times in the case of physiological saline.

Further, W10/W60×100 was 61.2%.

Comparison and Discussion on Examples F1–F16 and Comparative Examples F1–F3

In Comparative Example F1, the cross-linked polyaspartic acid resin derived by the hydrolysis had the sufficiently high water absorption but the workability was poor to result in lowered productivity.

In Comparative Example F2, the workability was very poor. Moreover, the cross-linked polyaspartic acid resin derived by the hydrolysis was able to show only the small water absorption of no practical utility.

In Comparative Example F3, it was attempted to produce a cross-linked polysuccinimide at high productivity. As a result, the cross-linked polyaspartic acid resin derived by the hydrolysis was able to achieve only the reduced water absorption.

In contrast, each of Examples F1–F16 was able to produce at high productivity the cross-linked polyaspartic acid resin which achieved the large water absorption and indicated the excellent water absorption speed.

What is claimed is:

1. A process for the production of a cross-linked polysuccinimide, which comprises dispersing a feed polysuccinimide with a dispersant thereby forming a dispersed polysuccinimide, and then reacting the dispersed polysuccinimide with a cross-linking agent.

2. The production process of claim 1, wherein said cross-linking agent is a basic amino acid carboxylate salt.

3. The production process of claim 1, wherein said dispersant is a poor solvent selected from the group consisting of organic solvents, which cannot achieve substantially complete dissolution of said feed polysuccinimide, and water.

4. The process of claim 1, wherein said cross-linked polysuccinimide is in a form of particles surfaces of which are highly cross-linked.

5. A process for the production of a cross-linked polysuccinimide, which comprises a first step of forming a gel containing a cross-linked polysuccinimide and a second step of disintegrating the gel containing the cross-linked polysuccinimide formed in the first step by grinding the gel containing the cross-linked polysuccinimide into particles.

6. A process for the production of a cross-linked polysuccinimide, which comprises reacting a feed polysuccinimide with a basic amino acid carboxylate salt as a cross-linking agent.

7. A cross-linked polysuccinimide produced by a process as defined in claim 1.

8. A process for the production of a cross-linked polysuccinimide, which comprises reacting a feed polysuccinimide, which has been brought into a dispersed state by a poor solvent, with a cross-linking agent while the cross-linking reaction is not slowed down by the poor solvent.

9. The production process of claim 8, wherein said cross-linking agent is a basic amino acid carboxylate salt.

10. The production process of claim 8, wherein said poor solvent is selected from the group consisting of organic solvents, which cannot achieve substantially complete dissolution of said feed polysuccinimide, and water.

11. The production process of claim 8, wherein said cross-linked polysuccinimide is in a form of particles surfaces of which are highly cross-linked.

* * * * *